(12) United States Patent
Yamaguchi

(10) Patent No.: US 6,980,826 B2
(45) Date of Patent: Dec. 27, 2005

(54) COMMUNICATION SYSTEM, A COMMUNICATION METHOD, AND A CELLULAR PHONE

(75) Inventor: Tomohisa Yamaguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 729 days.

(21) Appl. No.: 09/725,484

(22) Filed: Nov. 30, 2000

(65) Prior Publication Data

US 2001/0046851 A1    Nov. 29, 2001

(30) Foreign Application Priority Data

May 29, 2000    (JP)    ............................... 2000-157680

(51) Int. Cl.[7] .............................................. H04M 1/00
(52) U.S. Cl. .............................. 455/556.1; 455/556.2; 455/557; 455/414.1; 455/414.2; 455/414.3; 701/201; 701/203; 701/217; 701/219; 340/506; 340/539.1; 340/539.14; 340/825.36; 340/825.49
(58) Field of Search .......................... 455/556.1, 556.2, 455/414.1, 414.2, 414.3, 426, 557; 370/352, 370/486; 340/506, 539.1, 539.14, 825.36, 340/825.49; 701/201, 203, 217, 219

(56) References Cited

U.S. PATENT DOCUMENTS 6,145,084 A * 11/2000 Zuili et al. .................. 713/201
6,222,483 B1 * 4/2001 Twitchell et al. ........ 342/357.09
6,282,281 B1 * 8/2001 Low ............................ 379/230
6,337,858 B1 * 1/2002 Petty et al. .................. 370/356
6,368,205 B1 * 4/2002 Frank ......................... 455/413
6,404,884 B1 * 6/2002 Marwell et al. ........ 379/265.13
6,453,162 B1 * 9/2002 Gentry ....................... 455/433
6,456,854 B1 * 9/2002 Chern et al. ................ 455/457
6,466,570 B1 * 10/2002 Low et al. ................... 370/352
6,477,565 B1 * 11/2002 Daswani et al. ............ 709/217
6,556,217 B1 * 4/2003 Mäkipää et al. ............ 345/687
6,609,005 B1 * 8/2003 Chern ......................... 455/457

FOREIGN PATENT DOCUMENTS

JP           11-177679        7/1999

* cited by examiner

Primary Examiner—Marceau Milord
(74) Attorney, Agent, or Firm—Birch, Stewart, Kolasch & Birch, LLP

(57) ABSTRACT

This invention provides a communication system for controlling a device through a network by using a mobile terminal for saving a space and a cost of a whole system. This invention provides contents from a cellular phone. This communication system comprises a cellular phone connected to a controller, and a terminal connected to a network. A Web browser requests to control a device, and a communication controller in a client side sends the request to the cellular phone. A Web server sends the request received at a communication controller in a server side to an extended module, and controls the controller.

22 Claims, 18 Drawing Sheets

Fig. 3

| MERCHANDISE NAME | REMAINING NUMBER | SALE NUMBER |
|---|---|---|
| JUICE A | 20 | 10 |
| JUICE B | 18 | 12 |
| JUICE C | 5 | 25 |
| JUICE D | 10 | 20 |
| COFFEE A | 15 | 15 |
| COFFEE B | 22 | 8 |

| CHANGE (¥10) |
|---|
| POOR |

| CHANGE (¥100) |
|---|
| FULL |

| INSIDE TEMPERATURE |
|---|
| 5°C |

PARAMETER 1 ◁▷ OOO ◁▷

ACCEPT

COMMUNICATION SYSTEM, A COMMUNICATION METHOD, AND A CELLULAR PHONE

BACKGROUND OF THE INVENTION

1. Field of the Invention

This invention relates to a communication system for controlling a device through a network. Particularly, this invention relates to a communication system for controlling by using a mobile terminal. Further, this invention relates a communication system for saving a space and a cost of a whole communication system. Furthermore, this invention relates to a communication system for providing contents from a cellular (mobile) phone.

2. Description of the Related Art

FIG. 14 illustrates an example of a system configuration for connecting a terminal to a mobile terminal through a network and accessing a device by using a Web server function.

In FIG. 14, a device 1, a controller 2 for controlling the device 1, a Web server 3 incorporated into the device 1, a Web server software 4 for realizing a Web server function of the Web server 3, an extended module software 5 for extracting data from the controller 2 and controlling the controller 2, etc. by a request from the Web server software 4, and an interface 6 for the controller for communicating between the controller 2 and the Web server 3 are illustrated. Further, a terminal 7 for instructing to obtain a condition of the device 1 and control the device 1, a Web browser software 8 in the terminal 7 for providing a user interface and performing a HTTP (Hyper Text Transfer Protocol) communication with the Web server software 4, a network 9 used for communication between the device 1 and the terminal 7, a cellular (mobile) phone 10 used for connecting the device 1 to the network 9, and an interface 11 for the cellular phone for communicating between the Web server 3 and the cellular phone 10 are illustrated.

In this system configuration, the cellular phone 10 is used only for connecting the Web server 3 and the network 9.

Therefore, the device 1 must have a function as a server. Hence, physically, space, and power source, etc. for both of the Web server 3 and the cellular phone 10 are necessary. Further, a cost of the whole system increases by providing the Web server 3, as a cost of the Web server is not likely to go down by mass production, compared with the cellular phone.

FIG. 15 illustrates an example of a system configuration for accessing a Web server from a cellular phone through a network.

In FIG. 15, a cellular (mobile) phone 21, a Web server 22, a network 23 used for communication between the cellular phone 21 and the Web server 22, a Web server software 24 for realizing a Web server function of the Web server 22, static contents 25 which are static data provided by the Web server 22, an extended module software 26 for generating dynamic contents provided by the Web server 22, etc., and a Web browser software 27 incorporated into the cellular phone 21 for accessing the contents provided by the Web server 22 and providing a user interface are illustrated.

In this system configuration, the cellular phone 21 is used only for extracting the contents provided by the Web server 22.

Therefore, it is impossible to provide the contents to the terminal. For example, it is impossible for the cellular phone to realize a visual (television) phone for providing a dynamic image as contents to the terminal through the Internet.

SUMMARY OF THE INVENTION

It is one of the objects of this invention to solve the above-stated problems in the related art. It is one of aims of this invention to provide a server function to a cellular phone for saving a space and a cost of a whole system. Further, it is also one of aims of this invention to provide a system for offering the contents from the cellular phone to the terminal.

A communication system includes a cellular phone connected to a controller and a terminal connected to the cellular phone through a network. The terminal includes a browser for outputting a request to the controller, and a communication controller in a client side for sending the request to the cellular phone through the network. The cellular phone includes a communication controller in a server side for receiving the request, and a server for operating the controller according to the request.

A communication method of a communication system including a cellular phone connected to a controller and a terminal connected to the cellular phone through a network has sending a request for the controller from the terminal to the cellular phone through the network, receiving the request by the cellular phone, and operating the controller by the cellular phone according to the request.

A cellular phone, connected to a controller and further connected to a terminal through a network, includes a communication controller in a server side for receiving a request for the controller from the terminal through the network, and a server for operating the controller according to the request.

A communication system includes a cellular phone having a controller and a terminal connected to the cellular phone through a network. The terminal includes a browser for outputting a request to the controller, and a communication controller in a client side for sending the request to the cellular phone through the network. The cellular phone includes a communication controller in a server side for receiving the request, and a server for operating the controller according to the request.

A communication method of a communication system includes a cellular phone having a controller and a terminal connected to the cellular phone through a network has sending a request for the controller from the terminal to the cellular phone through the network, receiving the request by the cellular phone, and operating the controller by the cellular phone according to the request.

A cellular phone including a controller, and connected to a terminal through a network, has a communication controller in a server side for receiving a request for the controller from the terminal through the network, and a server for operating the controller according to the request.

A cellular phone connected to a server through a network includes a browser for the cellular phone for outputting a first request, a communication controller for transmitting the first request, and a server for the cellular phone operating according to the transmitted first request. The browser for the cellular phone further outputs a second request, and the communication controller further sends the second request to the server through the network.

A communication method of a cellular phone connected to a server through a network including a browser for the cellular phone, a server for the cellular phone and a communication controller has outputting a first request by the browser for the cellular phone, transmitting the first request by the communication controller, operating according to the transmitted first request by the server for the cellular phone, outputting a second request by the browser for the cellular phone, and sending the second request to the server through the network by the communication controller.

In a communication system, an electronic mail function is incorporated into a cellular phone, and further the cellular phone is incorporated into or connected to a device for using the cellular phone as a mechanism for communicating between the device and a terminal for managing the device. An electronic mail describing contents of an event is sent to the terminal in case that event occurs in the device.

In a communication system, a cellular phone is incorporated into or connected to a device for using the cellular phone as a mechanism for communicating between the device and a terminal for managing the device. The terminal extracts a location of the device by a function of obtaining location data in a cellular phone system.

In a communication system, a cellular phone is incorporated into or connected to a device for using the cellular phone as a mechanism for communicating between the device and a terminal for controlling the device. Contents of an event are informed by a telephone function of a cellular phone system in case that the event occurs in the device.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

BRIEF DESCRIPTION OF THE DRAWINGS

FIG. 3 illustrates an example of the initial screen in Embodiment 1;

DETAILED DESCRIPTION OF THE PREFERRED EMBODIMENTS

Embodiment 1

Figure 1:
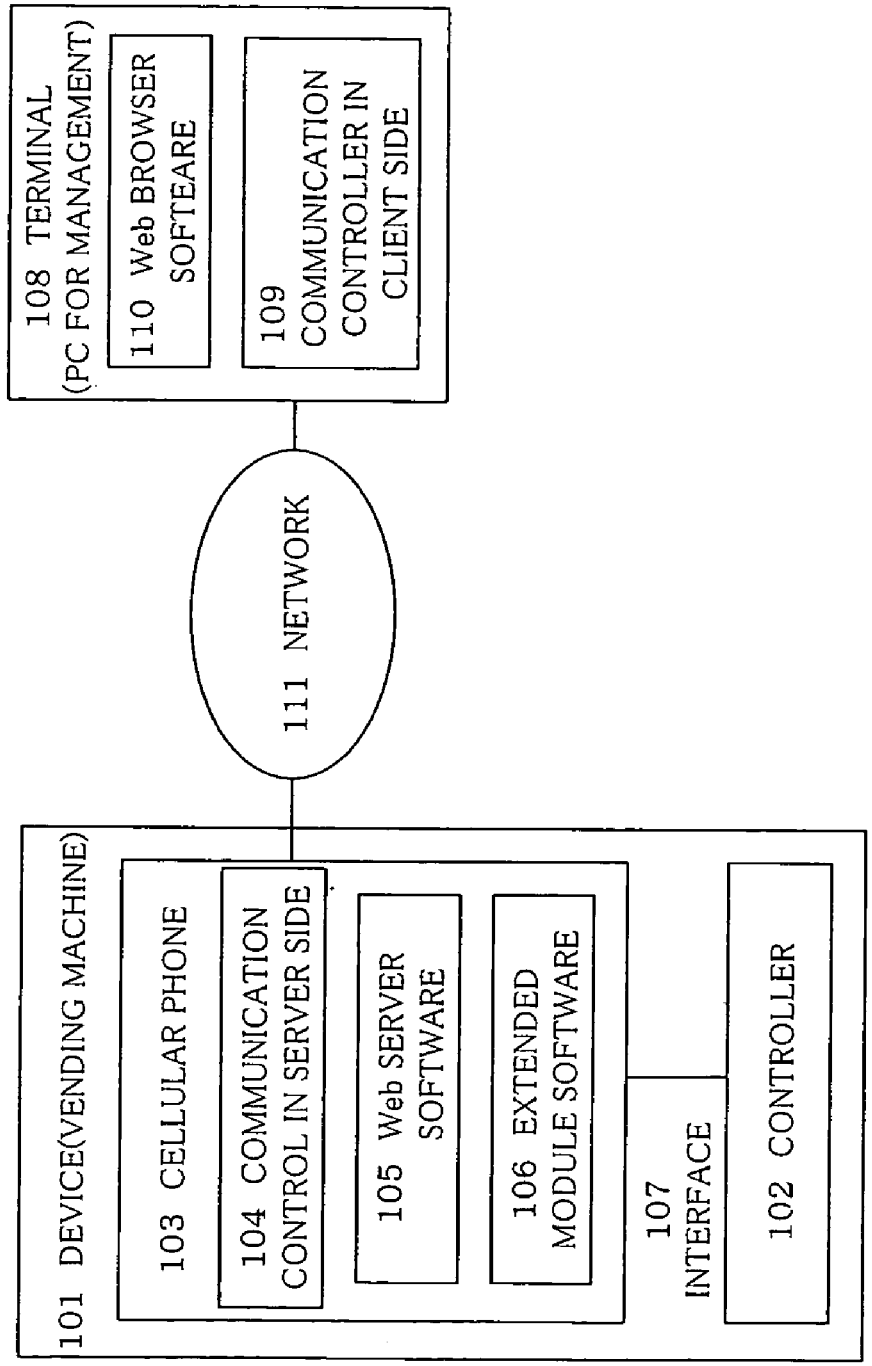
FIG. 1 illustrates a system configuration in Embodiment 1.

Explanation are made on this invention based on embodiments illustrated in the drawings.

FIG. 1 illustrates a system configuration in Embodiment 1.

In FIG. 1, a device 101, a controller 102 for controlling the device 101, a cellular (mobile) phone 103, a communication controller 104 in a server side for controlling a communication protocol as a server, a Web server software 105 for realizing a Web server function of the cellular phone 103, an extended module software 106 for extracting data from the controller 102 and controlling the controller 102, etc. according to a request from the Web server software 105, and an interface 107 for the controller for communicating between the controller 102 and the cellular phone 103 are illustrated. Further, a terminal 108 for instructing to obtain a condition of the device 101 and control the device 101, a communication controller 109 in a client side for controlling a communication protocol as a client, a Web browser software 110 in the terminal 108 for providing a user interface and performing a HTTP communication with the Web server software 105, and a network 111 used for communication between the device 101 and the terminal 108 are illustrated.

The device 101 can be anything, e.g., a vending machine, monitor camera, car, electric power meter, etc. as far as it can provide a condition and data of the device and can be controlled by accessing from an outside.

In this example, the cellular phone 103 is incorporated into the device 101. However, a configuration of connecting from an outside of the device 101 through the interface 107 for the controller is also possible.

In this example, the Web server software 105 is incorporated into the cellular phone 103 for providing the Web server function, however configurations for providing other server functions are also effective. It is also possible to incorporate server software, e.g., FTP (File Transfer Protocol) server software, SMTP (Simple Mail Transfer Protocol) server software, etc. which provide other server functions.

The interface 107 for the controller can be either a wire interface, e.g., serial, parallel, USB (Universal Serial Bus), etc. or a wireless interface, e.g., Bluetooth.

The terminal 108 can be anything, e.g., a cellular phone, mobile terminal, notebook-sized PC (Personal Computer), desktop PC, WS (Work Station), etc., as far as it is connected to the network 111 and it can operate the Web browser software 110.

In the following embodiment, explanations are made on a case in which the device 101 is a vending machine, and the terminal 108 is a PC for managing. Explanations are made on a method for obtaining data of the vending machine (device) 101 by using the Web browser software 110 in the PC (terminal) 108 for managing and controlling the vending machine 101.

At first, a user, who tries to obtain the data from the vending machine 101 and control the vending machine 101, needs to request an initial screen from the vending machine 101 by using the Web browser software 110 operated in the PC 108 for managing. In the request for the initial screen, a URL (Uniform Resource Location) indicating the intended vending machine 101 must be specified.

The initial screen is a screen for displaying a present condition of the vending machine 101 and inputting a parameter for obtaining particular data and instructing controlling, for example. The initial screen is provided in a form of HTML (Hyper Text Markup Language) file, applet, etc., for example. In this example, the initial screen is provided in a form of a HTML file dynamically generated by the extended module software 106.

Figure 2:
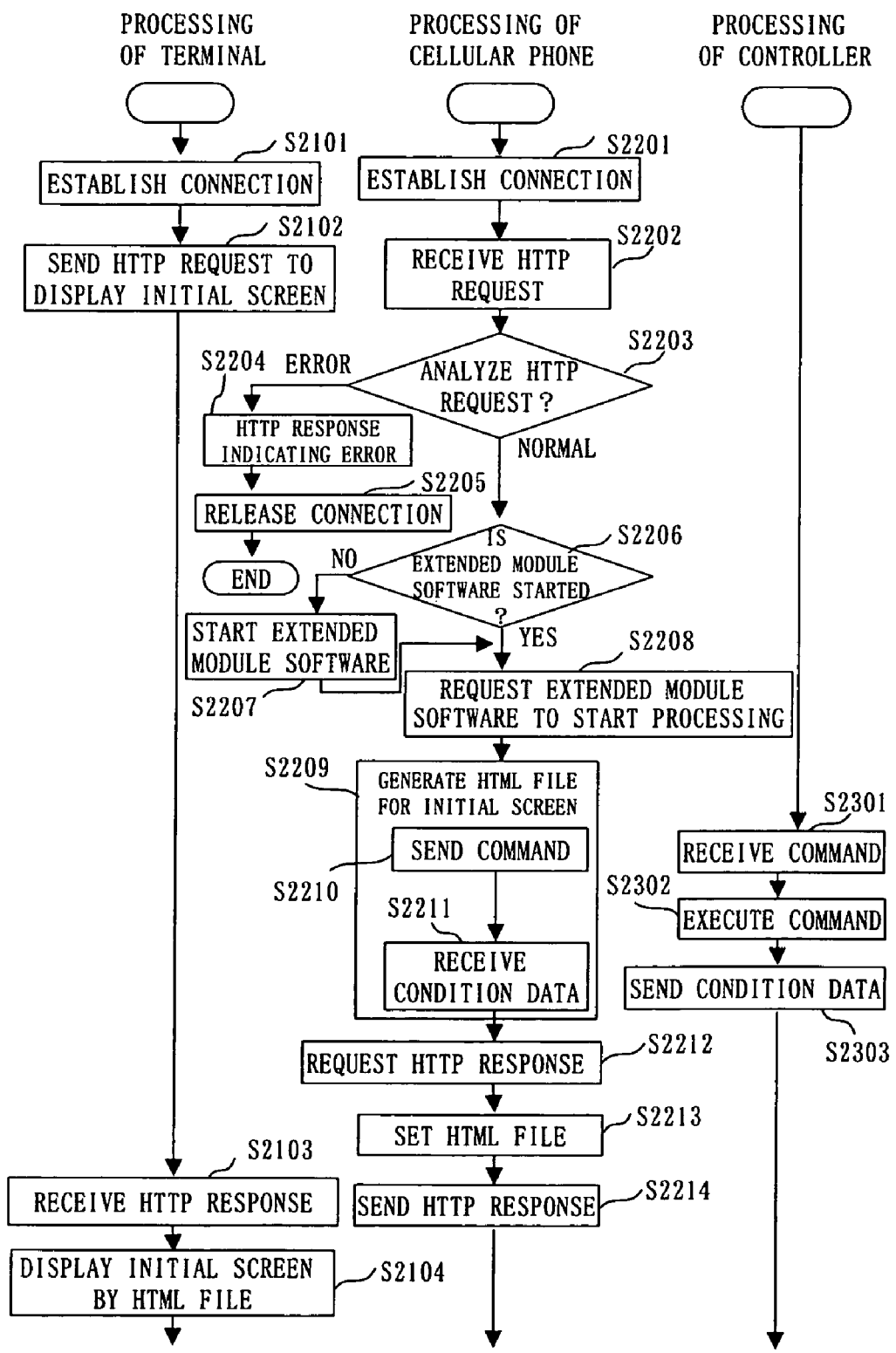
FIG. 2 shows a flow chart of processing till displaying an initial screen.

Explanations are made on processing of requesting the initial screen. FIG. 2 shows a flow chart of processing till displaying the initial screen.

The Web browser software 110 performs connection processing to the communication controller 104 in the server side incorporated into the cellular phone 103 by using the communication controller 109 in the client side. For connecting to the cellular phone 103 through the telephone line, it is possible to dial directly or connect via a provider, etc. (not illustrated) in the network 111.

The communication controller 109 in the client side and the communication controller 104 in the server side establish a TCP/IP (Transmission Control Protocol/Internet Protocol) connection by using a telephone line (Steps S2101, S2201). Hereinafter, HTTP communication between the Web server software 105 and the Web browser software 110 is performed in this connection.

When the connection with the vending machine 101 is established, the Web browser software 110 sends a HTTP request to the Web server software 105 (Step S2102).

The Web server software 105 receives the HTTP request from the Web browser software 110 (Step S2202), and analyzes the HTTP request (S2203).

In case that the HTTP request is normal, and the extended module software 106 is not started, the Web server software 105 starts the extended module software 106 (Step S2207), and outputs a request for starting processing to the extended module software 106 (Step S2208). In case that the extended module software 106 has been started, the Web server software 105 only outputs a request for starting processing (Step S2208).

In case that the HTTP request is not normal, the Web server software 105 returns an error signal indicating that the HTTP request is not normal to the Web browser software 110 as a HTTP response (Step S2204), releases the connection (Step S2205), and ends processing.

The extended module software 106 which has started processing generates a HTML file for an initial screen (Step S2209). For example, if the HTML file for the initial screen includes a condition of the vending machine 101, the extended module software 106 sends an appropriate command to the controller 102 through the interface 107 for the controller (Step S2210), obtains necessary condition data of the vending machine 101 (Step S2211), and includes the data in the HTML file. FIG. 3 illustrates an example of the initial screen in Embodiment 1. The initial screen is arranged to display conditions, e.g., a remaining number, a sale number, change, an inside temperature, etc.

The extended module software 106 requests the Web server software 105 to return the generated HTML file to the Web browser software 110 as a response (Step S2212).

The requested Web server software 105 sets the HTML file requested by the extended module software 106 in an entity of the HTTP response (Step S2213), and sends the HTML file to the Web browser software 110 (Step S2214).

When the Web browser software 110 receives the HTML file, the Web browser software 110 analyzes the HTML file sent from the Web server software 105, and displays contents of the file (Steps S2103, S2104).

In this way, the Web browser software 110 displays the initial screen. Hence, a user can obtain data from the vending machine and instruct controlling to the vending machine 101 by operating the initial screen.

Figure 4:
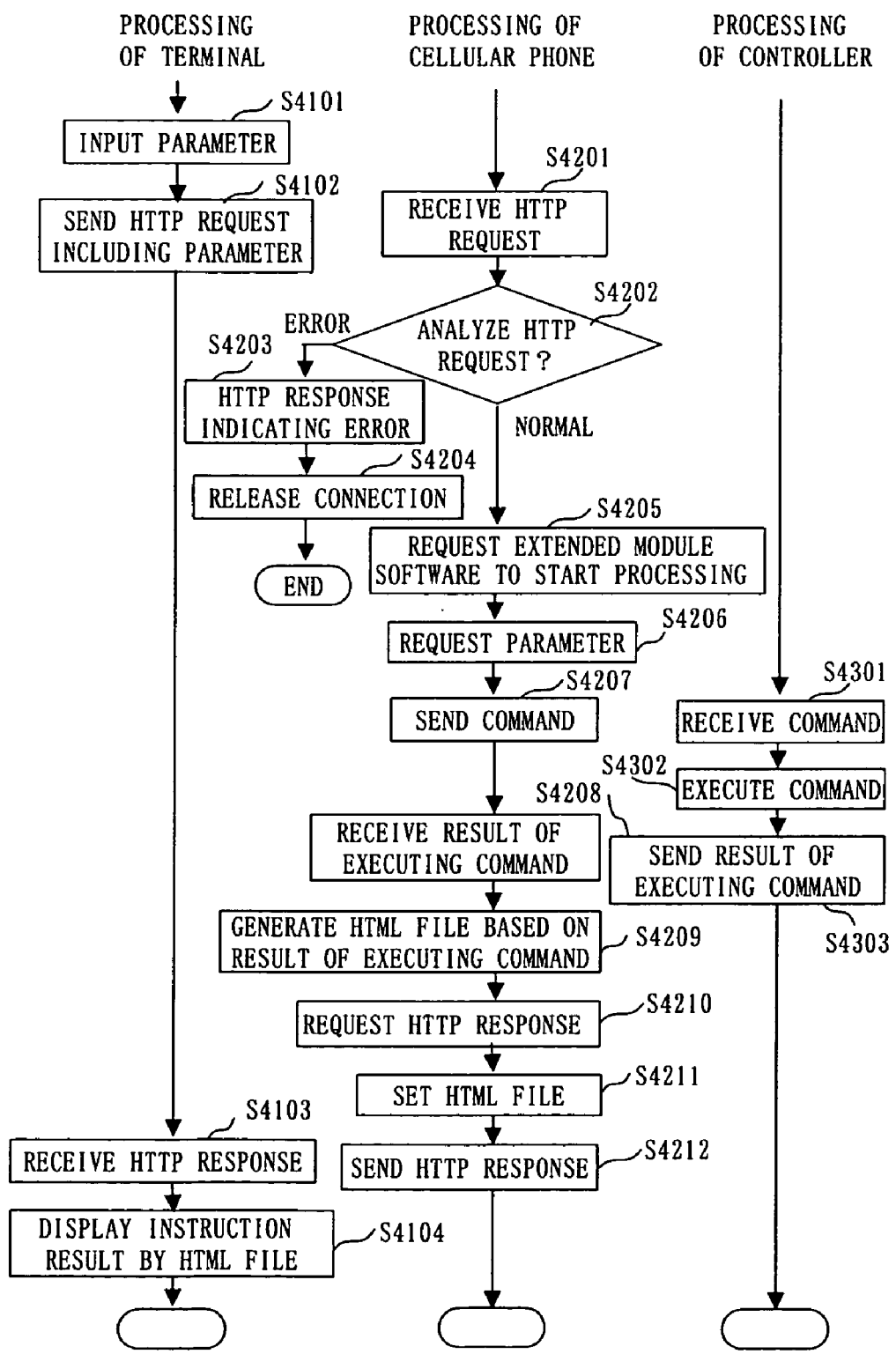
FIG. 4 shows a flow chart of processing till displaying an instruction result.

Explanations are made on processing of obtaining data from the vending machine 101 and instructing controlling. FIG. 4 shows a flow chart of processing till displaying an instruction result.

The user sets or selects a parameter for instructing the vending machine 101. Further, the user presses an accept button for sending the parameter to the Web server software 105 (Step S4101).

The Web browser software 110 sends the HTTP request including the set or selected parameter to the Web server software 105 (Step S4102).

The Web server software 105 receives the HTTP request (Step S4201), and analyzes the HTTP request (Step S4202). If the HTTP request is normal, the Web server software 105 requests the extended module software 106 to start processing (Step S4205). If the HTTP request is not normal, the Web server software 105 returns an error signal showing that the HTTP request is not normal to the Web browser software 110 as a HTTP response (Step S4203), releases the connection (Step S4204), and ends processing.

The extended module software 106 requests a parameter set in the HTTP request from the Web server software 105 to judge contents of the request from the user to the vending machine 101 (Step S4206).

The extended module software 106 converts the obtained parameter to a command, etc. for the controller 102, and sends the command to the controller 102 through the interface 107 for the controller (Step S4207).

The controller 102 extracts condition data of the device (vending machine) 101 according to the sent command, or controls the device (vending machine) 101 (Steps S4301, S4302). Then, the controller 102 sends a result of executing the command (e.g., condition data or control result) to the extended module software 106 through the interface 107 for the controller (Step S4303).

The extended module software 106 generates a HTML file based on the result of executing the command sent from the controller 102 (Steps S4208, S4209), and requests the Web server software 105 to return the HTML file as a response to the Web browser software 110 (Step S4210).

The Web server software 105 sets the HTML file requested by the extended module software 106 as an entity of the HTTP response (Step S4211), and sends the HTML file to the Web browser software 110 (Step S4212).

The Web browser software 110 analyzes the HTML file sent from the Web server software 105, and displays contents (result of the instruction from the Web browser) (Steps S4103, S4104).

Then, operations requested to the vending machine 101 by the user complete.

In Embodiment 1, data of the device can be obtained or controlled from a PC for managing in a remote place only by incorporating the cellular phone into the device (e.g., vending machine).

Further, since the cellular phone has a function as the server, it is not necessary to provide a server for the device. Hence, a system configuration becomes simple, and both the space and the cost can be saved.

Embodiment 2

In embodiment 2, explanations are made on a monitor system by using the cellular phone.

Figure 5:
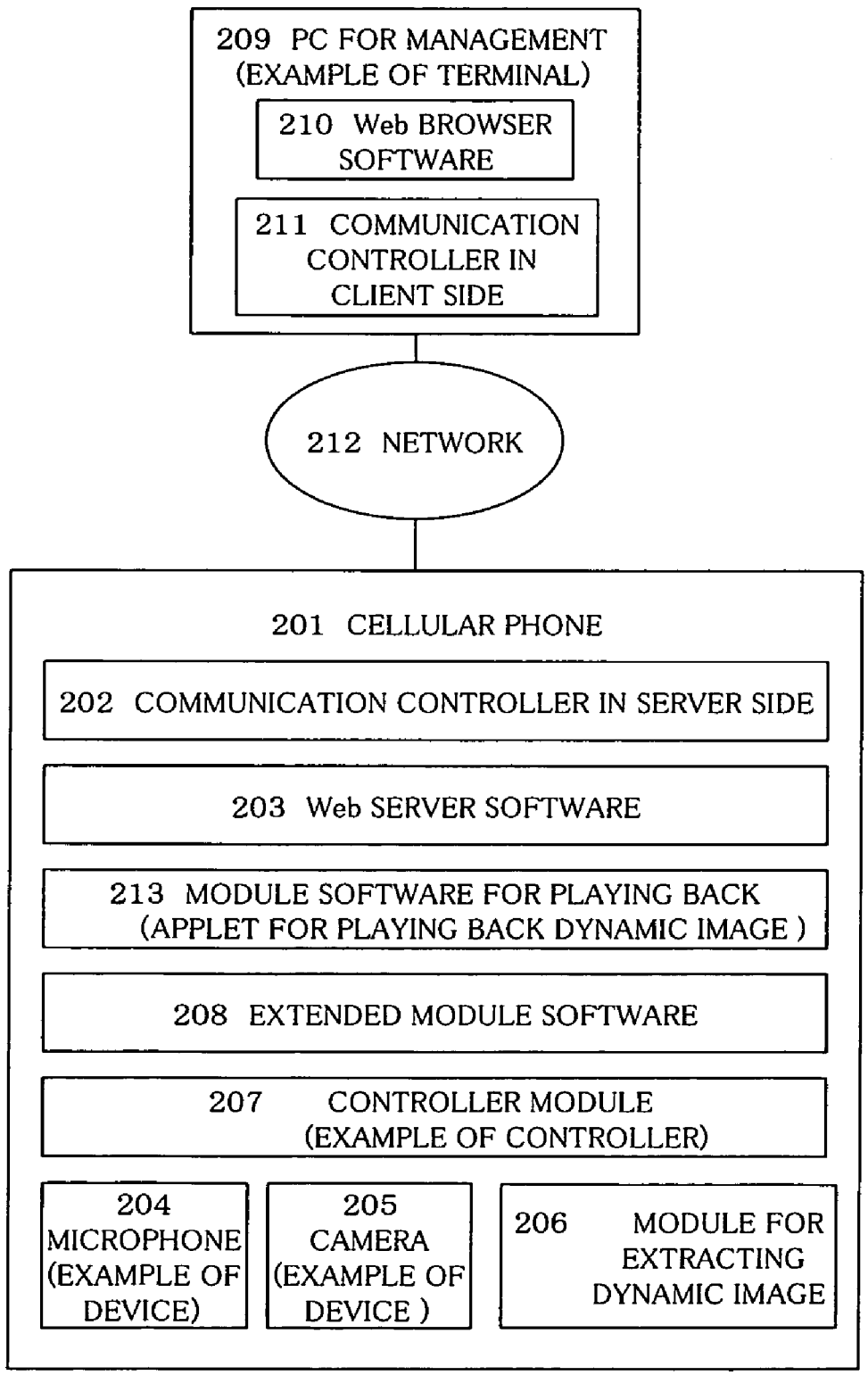
FIG. 5 illustrates a system configuration in Embodiment 2.

FIG. 5 illustrates a system configuration in Embodiment 2.

In FIG. 5, a cellular phone 201, a communication controller 202 in a server side for controlling a communication protocol as a server, a Web server software 203 for realizing a Web server function of the cellular phone 201, a microphone 204, a camera 205, a module 206 for extracting a dynamic image, which encodes a voice from the microphone 204 and an image from the camera 205 and extracts as a dynamic image, a control module 207 for controlling the microphone 204, the camera 205 and the module 206 for extracting the dynamic image, an extended module software 208 for extracting the dynamic image and instructing the control module 207, etc. by a request from the Web server software 203, a PC 209 for managing, which is a terminal for monitoring from a remote place, a Web browser software 210 for playing back (or reproducing) a voice and an image from the cellular phone 201 and controlling the cellular phone 201, a communication controller 211 in a client side for controlling a communication protocol as the client, a network 212 used for communication between the cellular phone 201 and the PC 209 for managing, and a module software 213 for playing back a dynamic image (an applet for playing back a dynamic image) in the Web browser software 210 are illustrated.

In this example, the PC 209 for managing is used as the client, however any apparatus may be used as far as it can be connected to the network 212, and the Web browser software 210 and the module 213 for playing back the dynamic image operate. For example, the cellular phone, a mobile terminal, a notebook-sized PC, a desktop PC, WS (Work Station), etc. are possible.

In this example, the module 213 for playing back the dynamic image is the applet for playing back the dynamic image, however any module is possible as far as it can be downloaded, and executed in the Web browser software 210.

In the following embodiment, explanations are made on a method for monitoring by the cellular phone 201 by using the Web browser software 210 in the PC 209 for managing.

A user, who tries to monitor by the cellular phone 201, needs to specify a URL indicating an intended cellular phone 201 by using the Web browser software 210 in the PC 209 for managing and request the initial screen from the cellular phone 201.

The initial screen in this example includes a function of outputting an image and voice for monitoring and various switches for controlling. The initial screen is provided in a form of a HTML file, applet, etc., for example.

Figure 6:
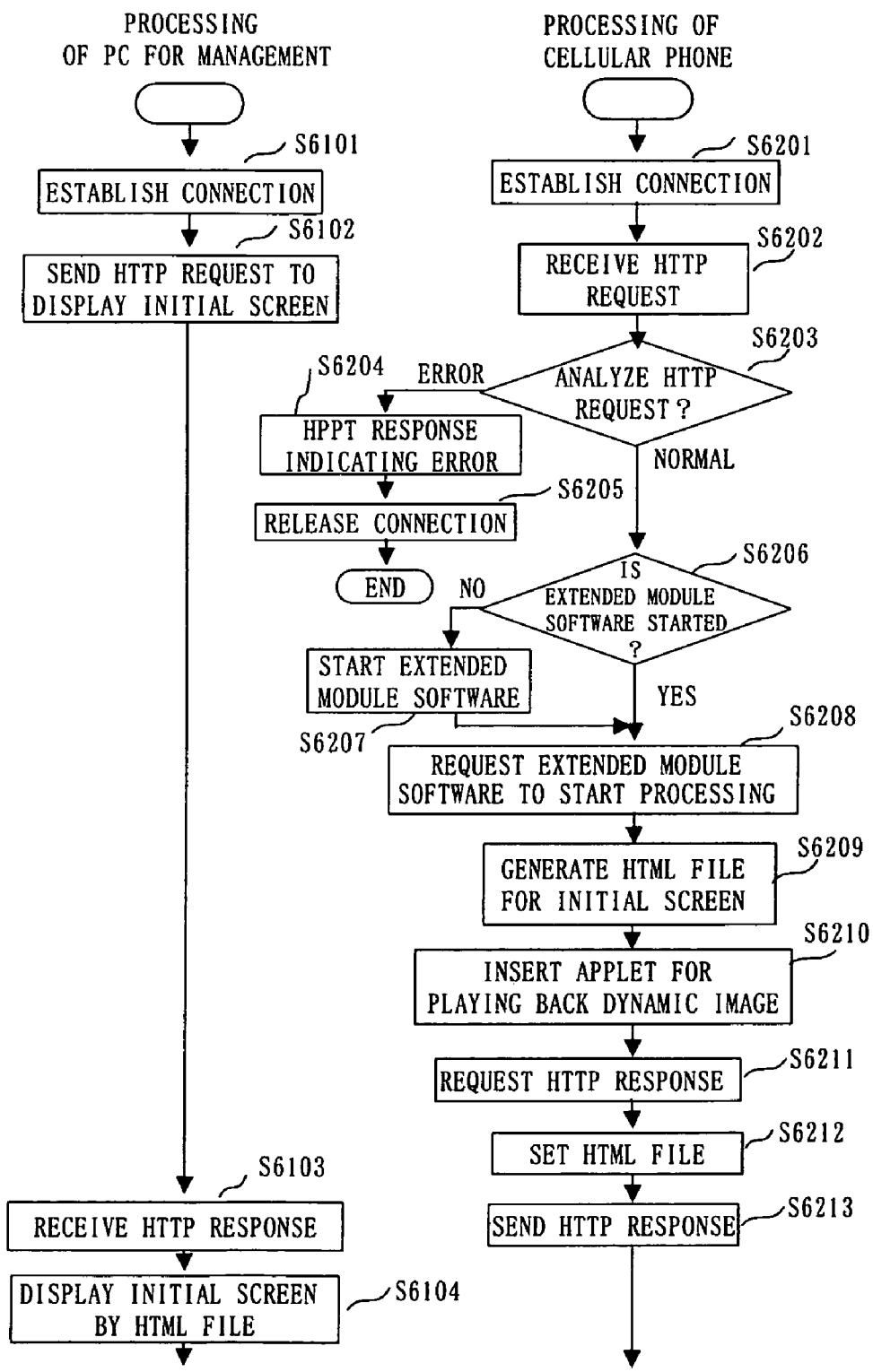
FIG. 6 shows a flow chart of processing till displaying an initial screen in Embodiment 2.

Explanations are made on processing of requesting the initial screen. FIG. 6 shows a flow chart of processing till displaying the initial screen in Embodiment 2.

The Web browser software 210 performs connection processing for the communication controller 202 incorporated into the cellular phone 201 by using the communication controller 211 in the client side. Connection of a telephone line to the cellular phone 201 can be established by either dialing directly or contacting through a provider, etc. (not illustrated) in the network 212.

The communication controller 211 in the client side and the communication controller 202 in the server side establish a TCP/IP connection through the telephone line (Steps S6101, S6201). Hereinafter, a HTTP communication between the Web server software 203 and the Web browser software 210 is performed in this connection.

When the connection with the cellular phone 201 is established, the Web browser software 210 sends the HTTP request to the Web server software 203 (Step S6102).

The Web server software 203 receives the HTTP request from the Web browser software 210 (Step S6202), and analyzes the HTTP request (Step S6203).

In case that the HTTP request is normal and the extended module software 208 is not started, the Web server software 203 starts the extended module software 208 (Step S6207), and requests the extended module software 208 to start processing (Step S6208). In case that the extended module software 208 has been started, only the request for starting processing is output (Step S6208).

In case that the HTTP request is not normal, the Web server software 203 returns an error signal showing that the HTTP request is not normal to the Web browser software 210 as a HTTP response (Step S6204), releases the connection (Step S6205), and ends processing.

The extended module software 208, which has started processing, generates a HTML file for the initial screen (Step S6209).

Figure 7:
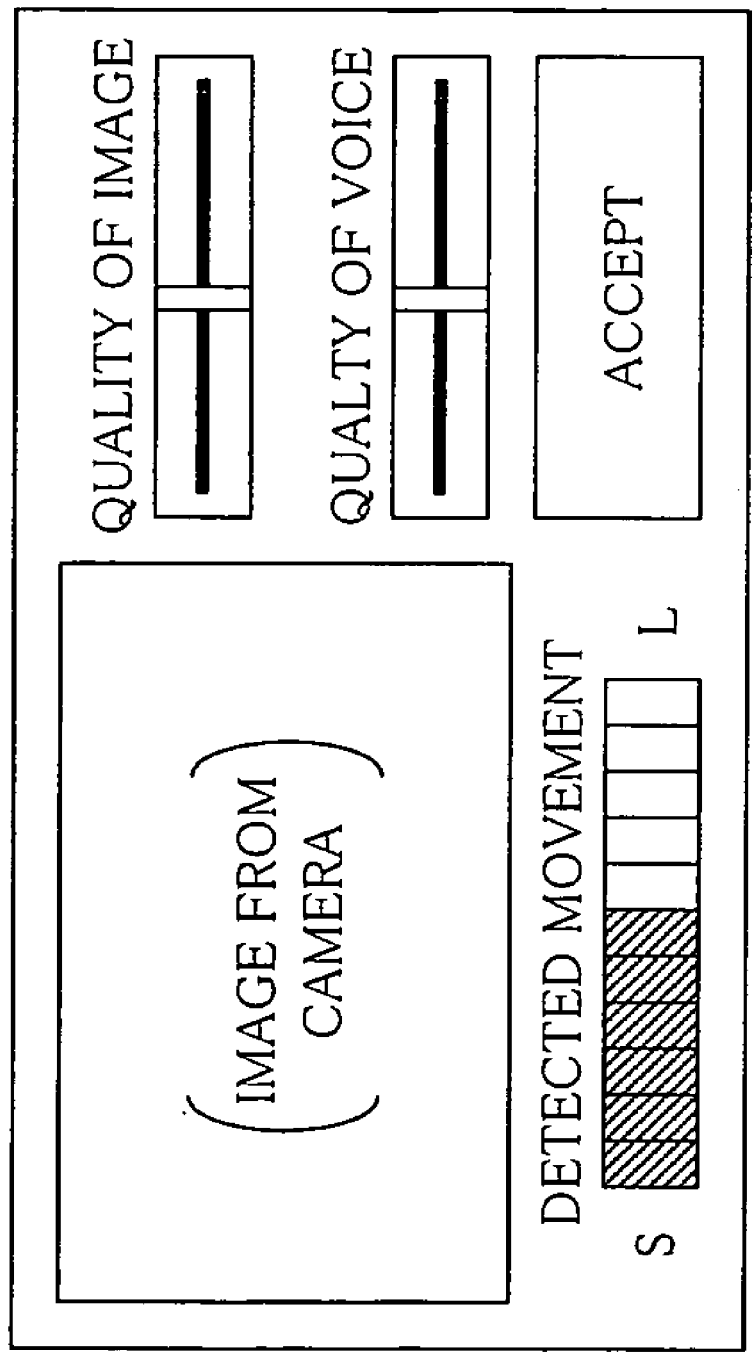
FIG. 7 illustrates an example of the initial screen in Embodiment 2.

FIG. 7 illustrates an example of the initial screen in Embodiment 2. The initial screen is based on the HTML file dynamically generated by the extended module software 208, and provided in a form of inserting the applet for playing back the dynamic image into the based HTML file (Step S6210). The applet 213 for playing back the dynamic image plays back the voice and image from the cellular phone 201.

The extended module software 208 requests the Web server software 203 to return the generated HTML file to the Web browser software 210 as a response (Step S6211).

The requested Web server software 203 sets the HTML file requested by the extended module software 208 as an entity of the HTTP response (Step S6212), and sends the HTML file to the Web browser software 210 (Step S6213).

When the Web browser software 210 receives the HTML file, the Web browser software 210 analyzes the HTML file sent from the Web server software 203, and displays the contents (Steps S6103, S6104).

Since the applet 213 for playing back the dynamic image is set in the HTML file for the initial screen, the Web browser software 210 requests the applet 213 for playing back the dynamic image from the Web server software 203 as a HTTP request (Steps S8101, S8102).

Figure 8:
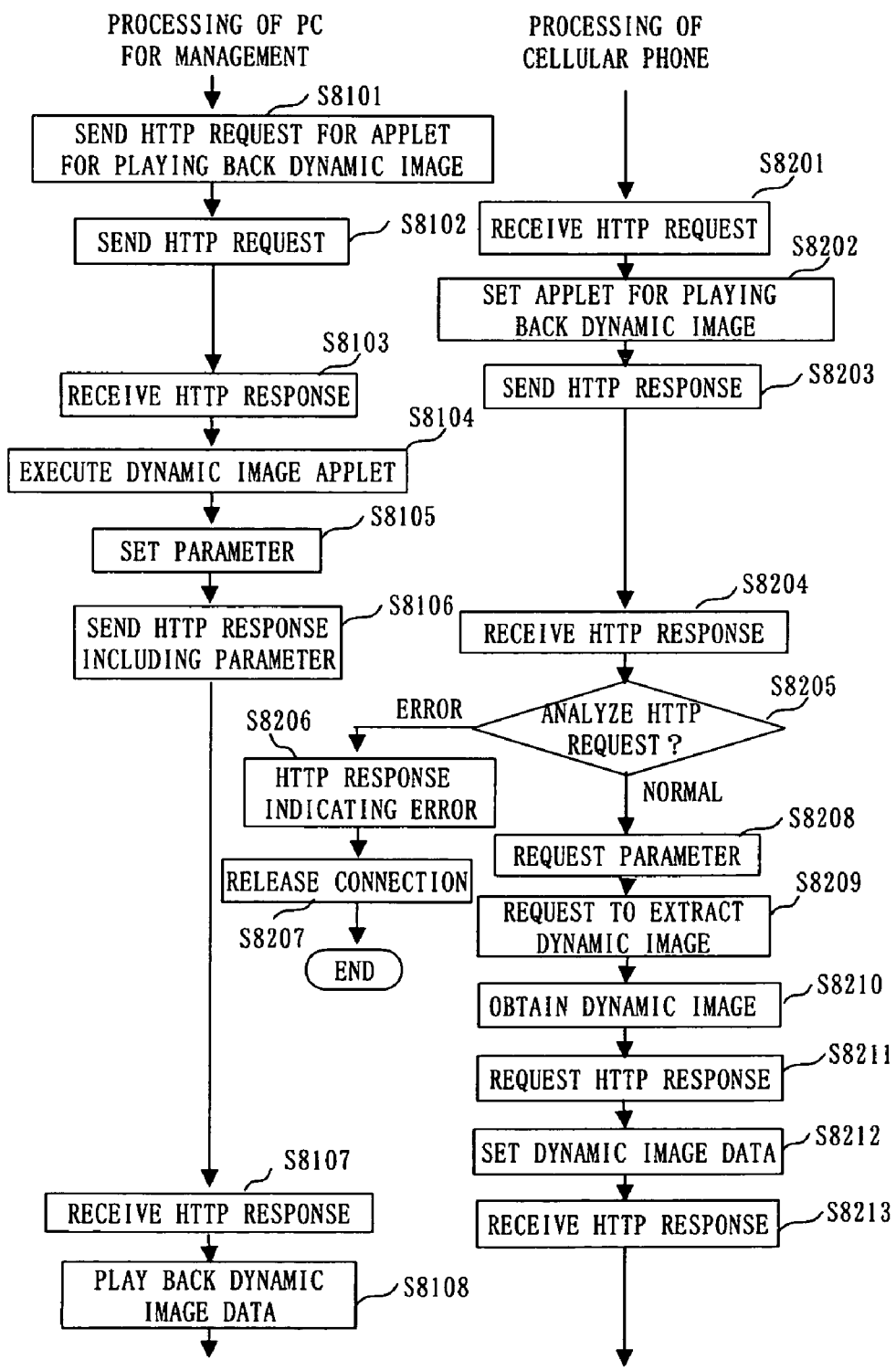
FIG. 8 shows a flow chart of processing till displaying a dynamic image.

FIG. 8 shows a flow chart of processing till displaying the dynamic image.

In the Web server software 203, the applet 213 for playing back the dynamic image is set in the entity of the HTTP request (Steps S8201, S8202), and sent to the Web browser software 210 (Step S8203). In the Web browser software 210, the sent applet 213 for playing back the dynamic image is executed (Steps S8103, S8104).

The applet 213 for playing back the dynamic image sends the HTTP request, in which a parameter for requesting a dynamic image monitored by the cellular phone 201 is set, to the Web server software 203 (Steps S8105, S8106).

The Web server software 203 analyzes the HTTP request sent from the applet 213 for playing back the dynamic image (Steps S8204, S8205). If the HTTP request is normal, a request for starting is sent to the extended module software 208 (Step S8208). If the HTTP request is not normal, a HTTP response showing that the HTTP request is not normal is returned to the module 213 for playing back the dynamic image as a HTTP response (Step S8206), a connection is released (Step S8207), and the processing is ended.

The extended module software 208 requests the parameter set in the HTTP request from the Web server software 203 (Step SS8208). The extended module software 208 judges the contents of processing based on the parameter.

The extended module software 208 performs the judged processing. In this example, the processing of extracting the dynamic image currently monitored by the cellular phone 201 is performed.

The extended module software 208 requests the module 206 for extracting the dynamic image to extract the dynamic image (Step S8209).

The module 206 for extracting the dynamic image encodes a voice from the microphone 204 and an image from the camera 205, generates a dynamic image, and returns the generated dynamic image to the extended module software 208 (Step S8210).

The extended module software 208 requests the Web server software 203 to return the dynamic image obtained from the module 206 for extracting the dynamic image to the applet 213 for playing back the dynamic image as a response (Step S8211).

The Web server software 203 sets the dynamic image data requested by the extended module software 208 as an entity of the HTTP response (Step S8212), and sends it to the applet 213 for playing back the dynamic image (Step S8213).

The applet 213 for playing back the dynamic image plays back the dynamic image data sent from the Web server software 203 (Steps S8107, S8108).

Among methods for displaying the dynamic image continuously, there are a method for repeatedly requesting the dynamic image from the applet 213 for playing back the dynamic image, and a method for repeatedly requesting the dynamic image to the module 206 for extracting the dynamic image from the extended module software 208 for the first request of the dynamic image from the applet 213 for playing back the dynamic image, and continuously sending the extracted dynamic image to the applet 213 for playing back the dynamic image, etc.

In this way, the initial screen is displayed by the Web browser software 210. The user can obtain the monitor data and instruct controlling for obtaining the monitor data by operating the initial screen.

Figure 9:
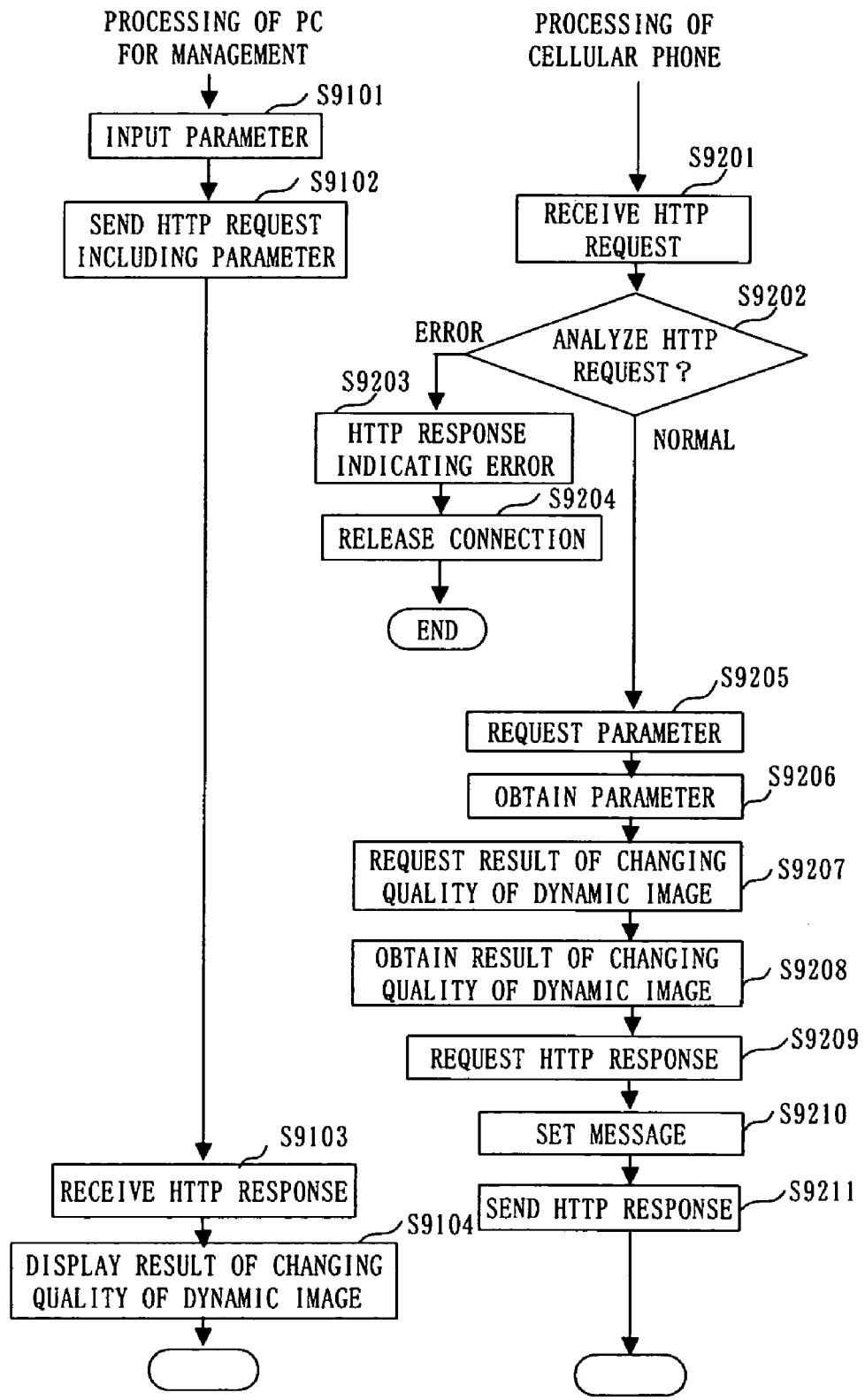
FIG. 9 shows a flow chart of processing till changing a quality of the dynamic image.

Explanations are made on processing of instructing to control the microphone and camera, and change a quality of the dynamic image, etc. by the user. FIG. 9 shows a flow chart of processing in changing the quality of the dynamic image.

The user determines the parameter sent to the cellular phone 201 by operating the initial screen, and presses an accept button in the initial screen for sending the parameter (Step S9101).

The Web server software 203 analyzes the sent HTTP request (Steps S9201, S9202). If the HTTP request is normal, the Web server software 203 requests the extended module software 208 to start processing. If the HTTP request is not normal, the Web server software 203 sends an error signal showing that the HTTP request is not normal to the Web browser software 210 as a HTTP response (Step S9203), release the connection (Step S9204), and ends the processing.

The extended module software 208 requests a parameter set in the HTTP request to the Web server software 203 (Step S9205). The contents of the request are judged based on the parameter.

The extended module software 208 performs processing according to the obtained parameter (Steps S9206, S9207). In this example, explanations are made on processing of changing the quality of the dynamic image. However, processing for controlling the microphone 204, the camera 205, and the module 206 for extracting the dynamic image, etc., besides changing the quality of the dynamic image is fundamentally same as the following method.

The extended module software 208 gives the obtained parameter to the control module 207.

The control module 207 requests the module 206 for extracting the dynamic image to change the quality of the dynamic image based on the given parameter (Step S9207).

The module 206 for extracting the dynamic image changes setting of the quality of the dynamic image for encoding to obtain the dynamic image in the requested quality, and returns a fact of changing to the control module 207. In case that the setting of the quality of the dynamic image can not be changed, the fact is returned to the control module 207.

The control module 207 returns a result of changing the quality of the dynamic image to the extended module software 208 (Step S9208).

The extended module software 208 generates a message showing a result of the HTTP request, and requests the Web server software 203 to return the message to the Web browser software 210 as a response (Step S9209).

The Web server software 203 sets the message in the entity of the HTTP response (Step S9210), and sends it to the Web browser software 210 (Step S9211).

The Web browser software 210 displays the message sent from the Web server software 203, and informs the result of changing the quality of the dynamic image to the user (Steps S9103, S9104).

In this way, operations of controlling the microphone and camera, or changing the quality of the dynamic image, etc. by the user are completed.

According to Embodiment 2, it becomes possible to monitor only by the cellular phone. In this embodiment, a monitor system is explained, however this invention can be easily applied to a visual (television) phone, video conference, etc.

Embodiment 3

In Embodiment 3, explanations are made on a system for applying a cellular phone, into which a Web server function is incorporated, to a car.

Figure 10:
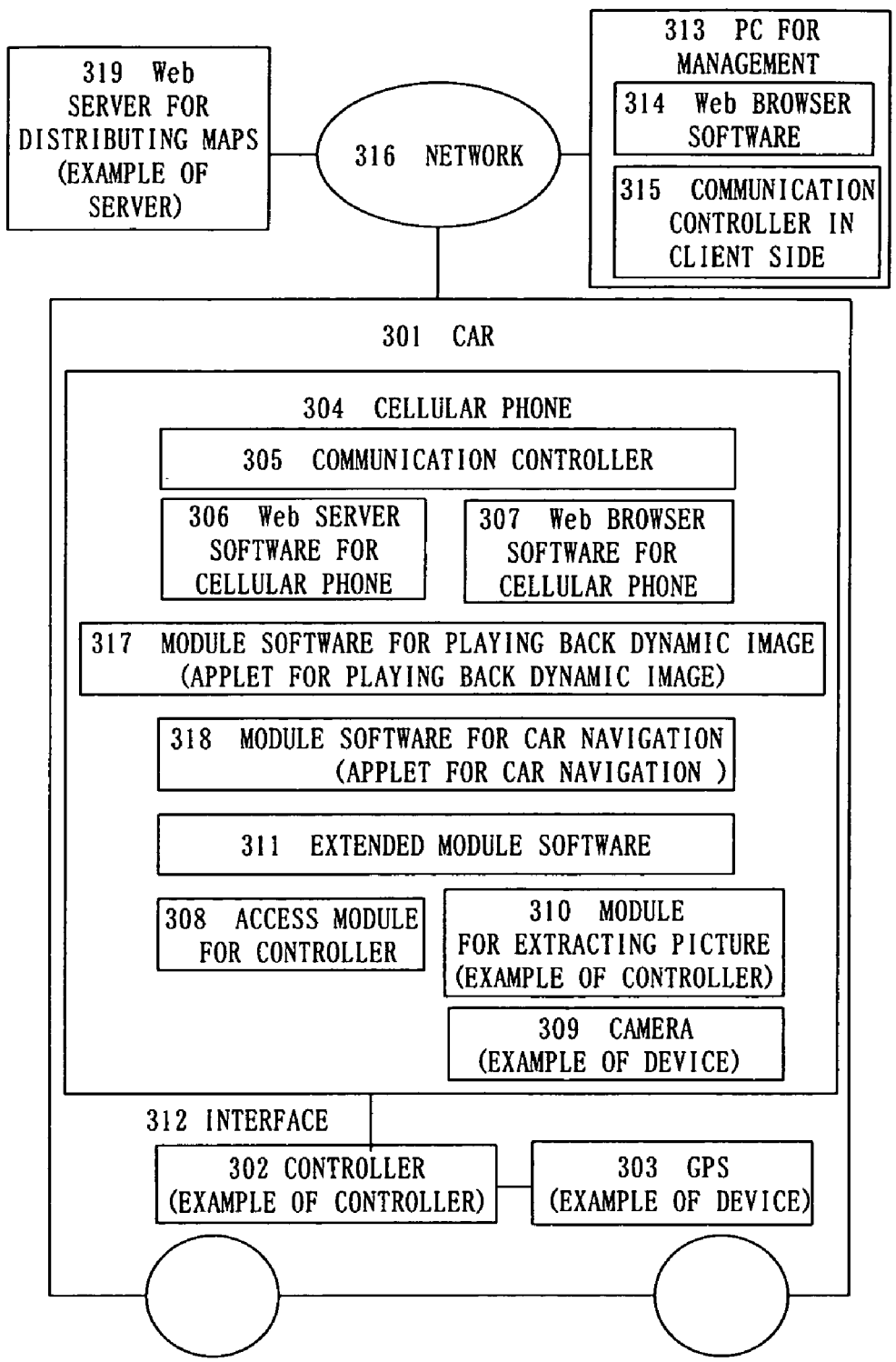
FIG. 10 illustrates a system configuration in Embodiment 3.

FIG. 10 shows a system configuration in Embodiment 3.

In FIG. 10, a car 301, a controller 302 for accessing a condition of the car and location data from an outside, a GPS (Global Positioning System) 303 for obtaining the location data of the car 301, a cellular phone 304, a communication controller 305 for controlling a communication protocol as a client and server, a Web server software 306 for a cellular phone for realizing a Web server function of the cellular phone 304, a Web browser software 307 for a cellular phone, an access module 308 for a controller for accessing to the controller 302, a camera 309, a module 310 for extracting an image from the camera 309 by encoding, an extended module software 311 for extracting data of a condition and location of a car from the access module 308 for the controller and extracting an image from the module 310 for extracting the image, an interface 312 for the controller for communicating between the cellular phone 304 and the controller 302, a PC 313 for managing, a Web browser software 314, a communication controller 315 in a client side for controlling a communication protocol for the client, a network 316 used for communication between the cellular phone 304 and the PC 313 for managing, a module 317 for playing back a dynamic image for playing back an image in the Web browser software 314, a module 318 for car navigation in the Web browser software 307 for the cellular phone, and a Web server 319 for distributing maps connected to the network 316 for distributing a requested map are illustrated.

In this example, the module 317 for playing back the dynamic image and the module 318 for car navigation are an applet for playing back a dynamic image and an applet for car navigation respectively. However, the module 317 for playing back the dynamic image can be in another form as far as the module can be downloaded and executed in the Web browser software 314. Further, the module 318 for car navigation can be in another form as far as the module can be downloaded and executed in the Web browser software 307 for the cellular phone.

Figure 11:
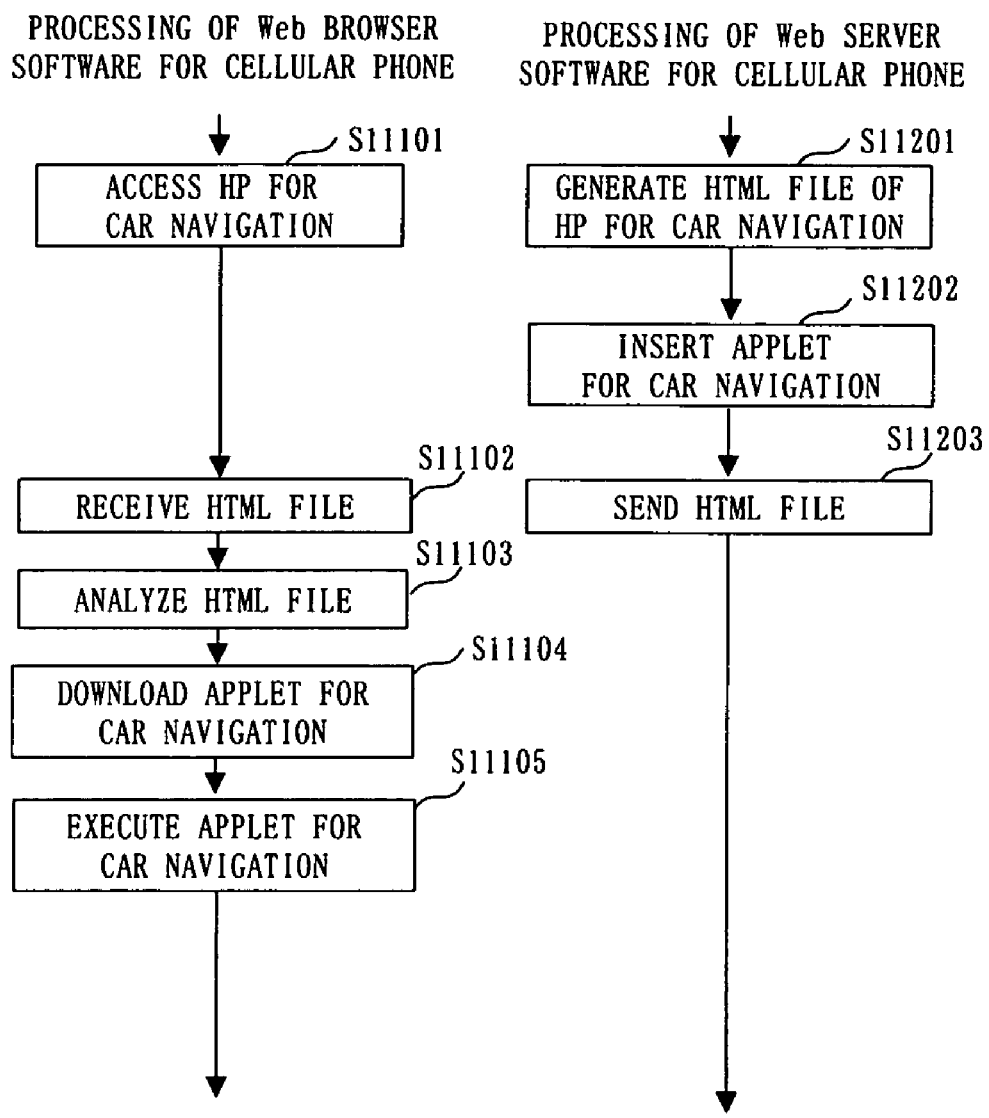
FIG. 11 shows a flow chart of processing till executing an applet for car navigation in processing of navigating.

Explanations are made on an access method by the Web browser software 307 for the cellular phone and the PC 313 for managing by using the cellular phone 304. In this example, explanations are made on a case in which navigation of the car is performed by using the Web browser software 307 for the cellular phone. FIG. 11 shows a flow chart of processing till executing the applet for car navigation in the processing of car navigation.

Figure 12:
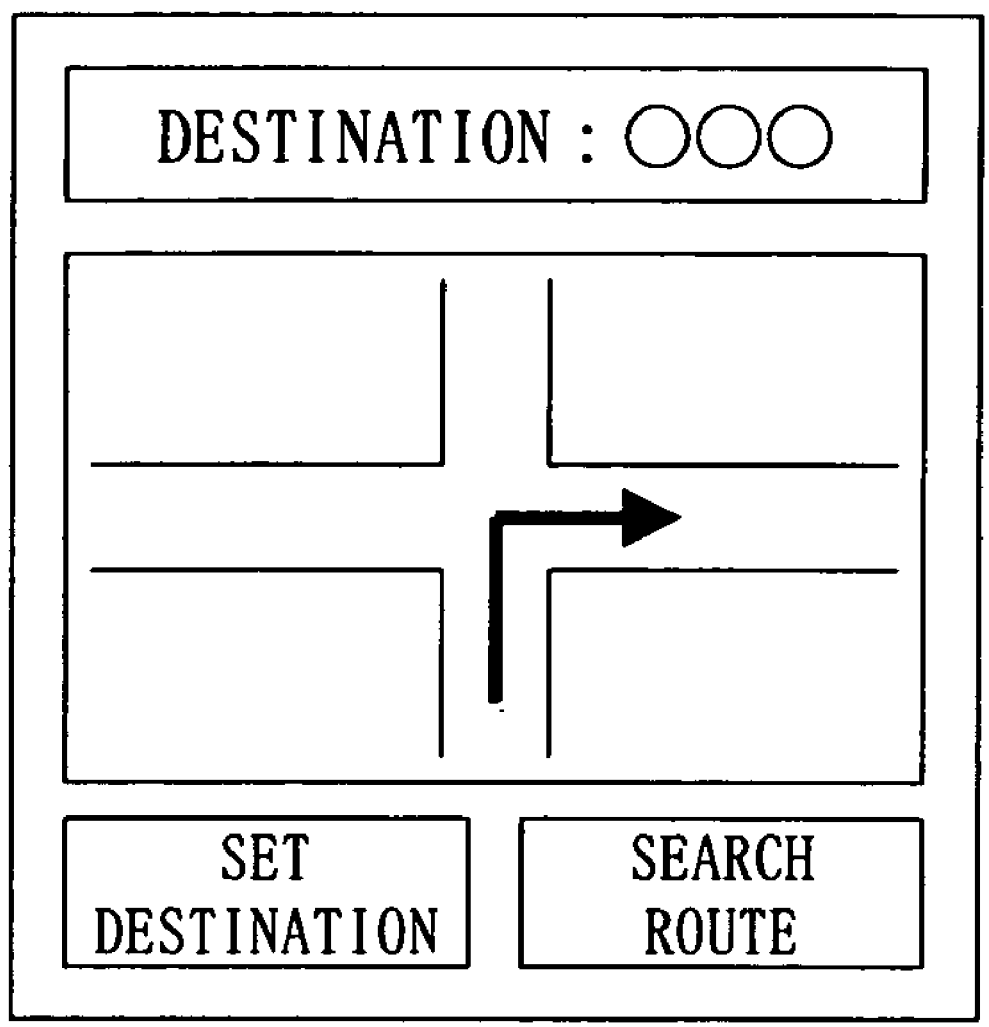
FIG. 12 illustrates an example of a home page for car navigation in Embodiment 3.

A user uses the Web browser software 307 for the cellular phone, and accesses a home page for car navigation provided by the Web server software 306 for the cellular phone through the communication controller 305 (Step S11101). This home page includes various buttons and maps for searching a route. FIG. 12 illustrates an example of a home page for car navigation in Embodiment 3.

In this case, the Web browser software 307 for the cellular phone and the Web server software 306 for the cellular phone are connected in the communication controller 305 without using the telephone line. Accordingly, the Web browser software 307 for the cellular phone can be connected to the Web server software 306 for the cellular phone in the cellular phone 304 and an external Web server (not illustrated) simultaneously. The home page for car navigation is dynamically generated as a HTML file by the extended module software 311 (Step S11201). The applet 318 for car navigation is inserted into the HTML file (Step S11202).

The Web browser software 307 for the cellular phone analyzes the HTML file (Step S11103), and downloads the applet 318 for car navigation from the Web server software 306 for the cellular phone (Step S11104).

The downloaded applet 318 for car navigation is executed in the Web browser software 307 for the cellular phone (Step S11105).

Figure 13:
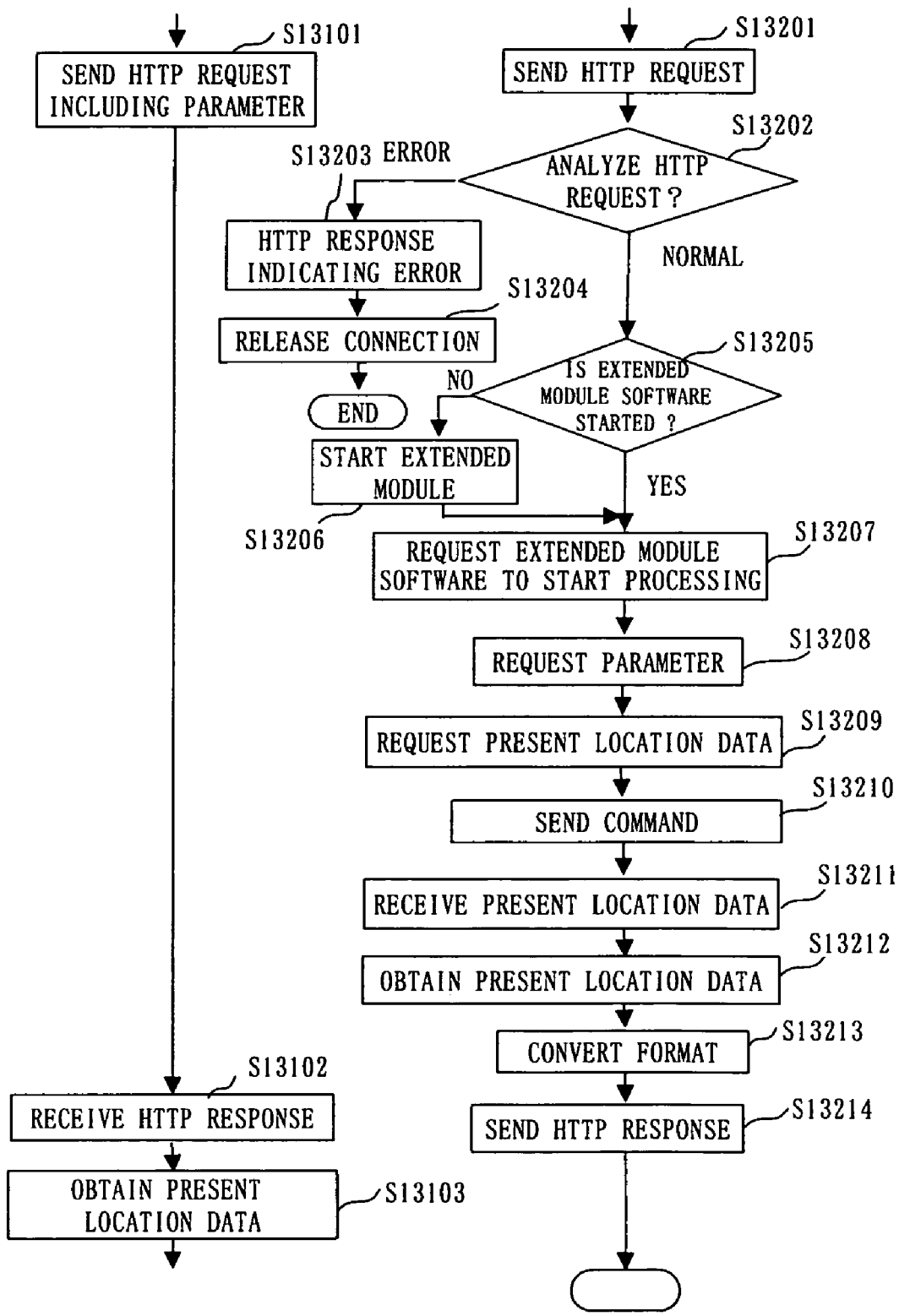
FIG. 13 shows a flow chart of processing till obtaining data of a present location in processing for car navigation.
Figure 14:
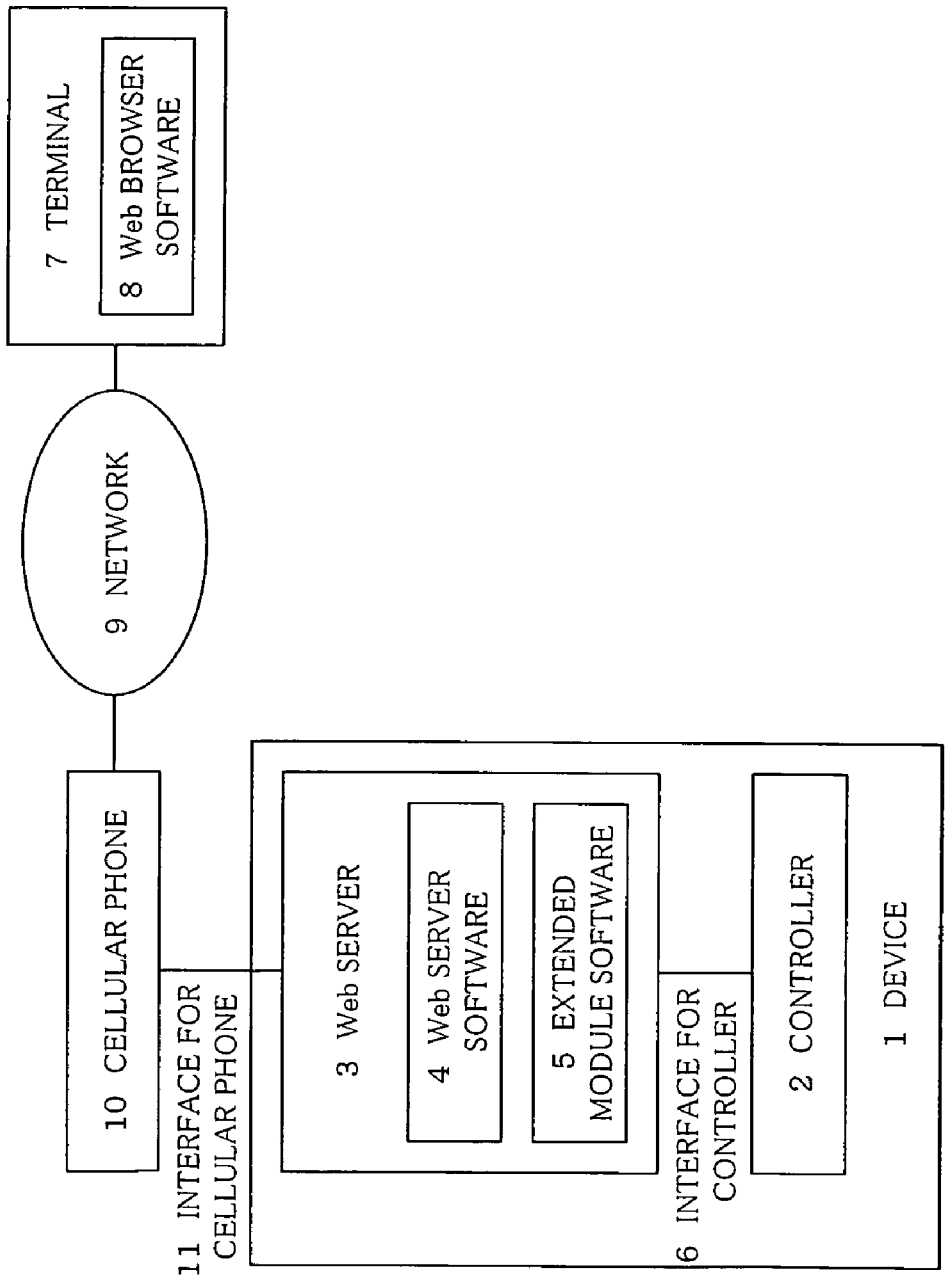
FIG. 14 illustrates an example of a system configuration for connecting a terminal to a mobile terminal through a network and accessing a device by using a Web server function.
Figure 15:
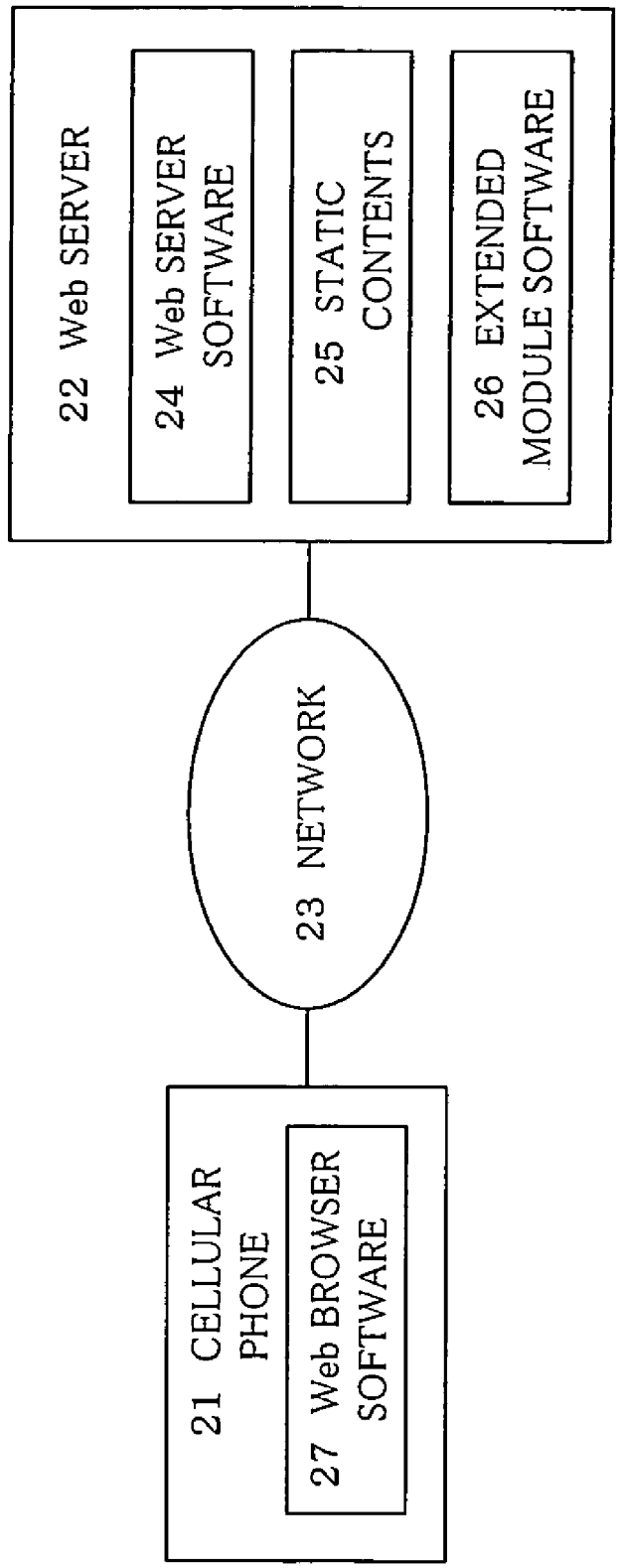
FIG. 15 illustrates an example of a system configuration for accessing a Web server from a cellular phone through a network.

The applet 318 for car navigation needs to obtain data of a present location of the car 301 for displaying an initial screen for car navigation. FIG. 13 shows a flow chart of processing till obtaining data of present location in the processing of car navigation.

The applet 318 for car navigation sets a parameter for obtaining the data of the present location in the HTTP request, and sends the HTTP request to the Web server software 306 for the cellular phone (Step S13101). The present location is displayed in the initial screen. It is also used to obtain a map corresponding to the present location.

If the extended module software 311 is not started, the Web server software 306 for the cellular phone starts the extended module software 311 (Step S13206) and sends a request for starting (Step S13207). If the extended module software 311 has been started, the Web server software 306 for the cellular phone only sends a request for starting (Step S13207).

The extended module software 311 requests the parameter set in the HTTP request to the Web server software 306 for the cellular phone (Step S13208). The extended module software 311 judges contents of processing based on the parameter.

The extended module software 311 gives the parameter to the access module 308 for the controller, and requests to extract data of the present location (Step S13209).

The access module 308 for the controller converts the parameter to a command for the controller, and sends the command to the controller 302 through the interface 312 for the controller (Step S13210).

The controller 302 extracts data of the present location according to the sent command by using the GPS 303, and gives the data to the access module 308 for the controller.

The access module 308 for the controller returns the sent location data to the extended module software 311 (Step S13212).

The extended module software 311 converts the location data to a format which can be used in the applet 318 for car navigation (Step S13213), and returns the converted location data to the applet 318 for car navigation (Step S13214).

The applet 318 for car navigation does not request from the access module 308 for the controller directly, as the applet can not access a resource in which the applet is to be downloaded. Therefore, in this example, the applet 318 for car navigation accesses the access module for the controller through the Web server software 306 for the cellular phone and the extended module software 311.

Further, the applet 318 for car navigation establishes a TCP/IP connection with the server 319 for distributing maps by the communication controller 305 for accessing the Web server 319 for distributing maps in the network 316.

The applet 318 for car navigation requests a map corresponding to the data of the present location to the Web server 319 for distributing maps based on the data of the present location extracted earlier.

The applet 318 for car navigation receives the map, and displays the map and the present location.

In this way, the home page for car navigation is displayed by the Web browser software 307 for the cellular phone. The user can search a route by operating the home page.

When the route is determined, the above-stated processing is performed along the route. In this way, navigation of the car can be performed.

Explanations are made on processing in case that a condition of the car 301 is monitored from the Web browser software 314 in the PC 313 for managing. There are cases in which the car 301 is broken and a broken part is checked from a remote place, or a location of a car in an accident is confirmed, or an inside of a car is monitored by using a camera of the cellular phone, for example.

The location data can be obtained by using the Web browser software 314 instead of the Web browser software 307 for the cellular phone, and using the applet for obtaining location data (not illustrated) instead of the module 318 for car navigation in the above-stated method. Data obtained by accessing the controller 302 can be obtained in a same method. Further, for monitoring the inside of the car from the Web browser software 314 in the PC 313 for managing, same processing with Embodiment 2 can be performed.

In embodiment 3, a function of car navigation can be performed, as the Web browser software 307 for the cellular phone and the Web server software 306 for the cellular phone are incorporated in the cellular phone 304.

It is also effective to configure each of the above-stated software as a hardware. Further, the network can be in any configuration.

Embodiment 4

In Embodiment 4, explanations are made on a system in which a cellular phone, into which an electronic mail (E-mail) function is incorporated, is applied to a vending machine.

Figure 16:
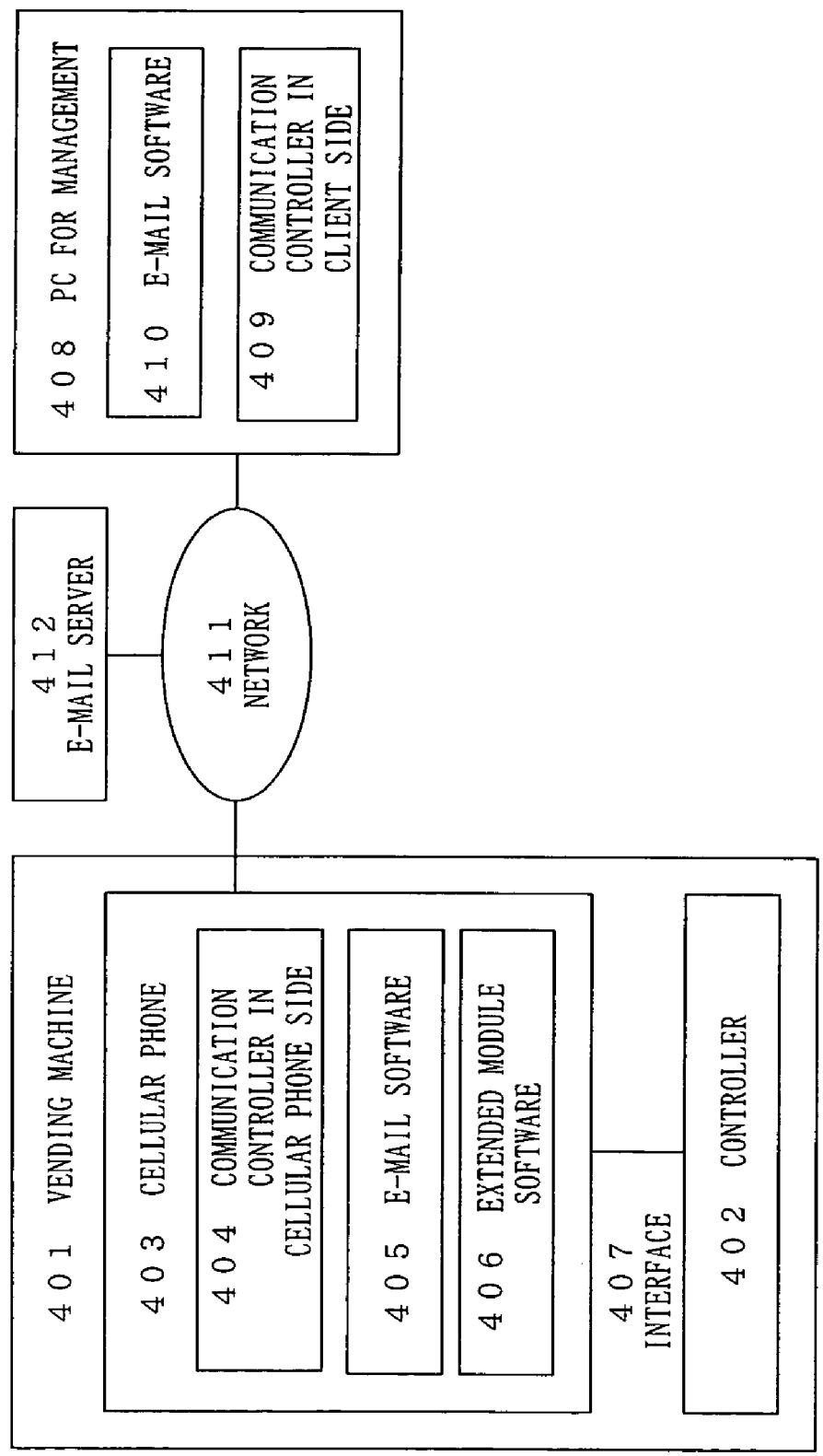
FIG. 16 illustrates a system configuration in Embodiment 4.

FIG. 16 shows a system configuration in Embodiment 4.

In FIG. 16, a vending machine 401, a controller 402 for controlling the vending machine 401, a cellular phone 403, a communication controller 404 in a cellular phone side for controlling a communication protocol for the cellular phone, and an E-mail software 405 for realizing the E-mail function of the cellular phone 403 are illustrated. The E-mail software 405 can be a SMTP server, or a SMTP client, or another software as far as the E-mail can be sent. In FIG. 16, an extended module software 406 cooperates with the E-mail software 405, obtains a condition of the controller 402, and requests the E-mail software 405 to send an E-mail at a time of error or regularly. In FIG. 16, an interface 407 for a controller for communicating between the controller 402 and the cellular phone 403, a PC 408 for managing, which receives an E-mail from the vending machine 401, and manages a condition of the vending machine 401, a communication controller 409 in a client side for controlling the communication protocol for the PC for managing, an E-mail software 410 for receiving and displaying an E-mail, a network 411 used for communication between the vending machine 401 and the PC 408 for managing, and an E-mail server 412 are also illustrated.

Explanations are made on a method of a push type data distribution from the vending machine 401 to the PC 408 for managing by using the E-mail software 405 incorporated into the cellular phone 403. In this example, data informing that the vending machine 401 is broken are pushed from the vending machine 401. However, the data can be any data, e.g., a lack of merchandise, a shortage of change, regular transmission of sale number, etc., as far as the data are sent actively from the vending machine 401 to the PC 408 for managing. Further, in this example, explanations are made on the vending machine as the device, however various devices, e.g., car, monitor camera, electric power meter, etc. are possible.

The extended module software 405 diagnoses if the controller is not broken through the interface 407. For diagnosing, a command for diagnosing is given to the controller 402. If data returned from the controller 402 are normal, it is judged that the controller does not have a trouble. If the data are not normal or the data are not returned within a predetermined time, it is judged that the controller has a trouble. In this example, the extended module software 405 gives the command for diagnosing, however it is also possible that a program for self-diagnosing (not illustrated) operated in the controller 402 reports to the extended module software 405 that the controller has the trouble.

When the extended module software 405 detects that the vending machine 401 has a trouble, the extended module software 405 creates an E-mail showing that the vending machine 401 has the trouble, and gives the E-mail to the E-mail software 405. The E-mail software 405 sends the mail given by the extended module software 406 to the E-mail server 412 connected to the network 411 by using a provided mail address for the PC 408 for managing. In this example, the E-mail software 405 specifies the mail address, however it is also possible that the extended module software 406 directs the mail address to the E-mail software 405. Further, in this example, the E-mail is sent to the E-mail server 412 connected to the network 411, however it is also possible that the E-mail software 405 is functioned as an E-mail server, and an E-mail is sent by a request for extracting an E-mail by the E-mail software 410 operated in the PC 408 for managing.

Then, the E-mail software 410 operated in the PC 408 for managing requests the E-mail server 412 connected to the network 411 to extract an E-mail regularly or by a request of the user for checking if any E-mail addressed to the PC 408 for managing is delivered. In this case, since there is an E-mail addressed to the PC 408 for managing showing that the vending machine has the trouble, this mail is sent to the E-mail software 410.

Then, the E-mail software 410 receives the E-mail, and informs the user of the PC 408 for managing that the E-mail is delivered.

Then, the user of the PC 408 for managing instructs the E-mail software 410 to read the E-mail, and the E-mail software 410 displays contents of the E-mail.

In this way, it is possible to inform the user of the PC for managing that the vending machine 401 has the trouble.

Embodiment 5

In Embodiment 5, explanations are made on a system in which a function for specifying a location of a cellular phone is applied to a car.

Figure 17:
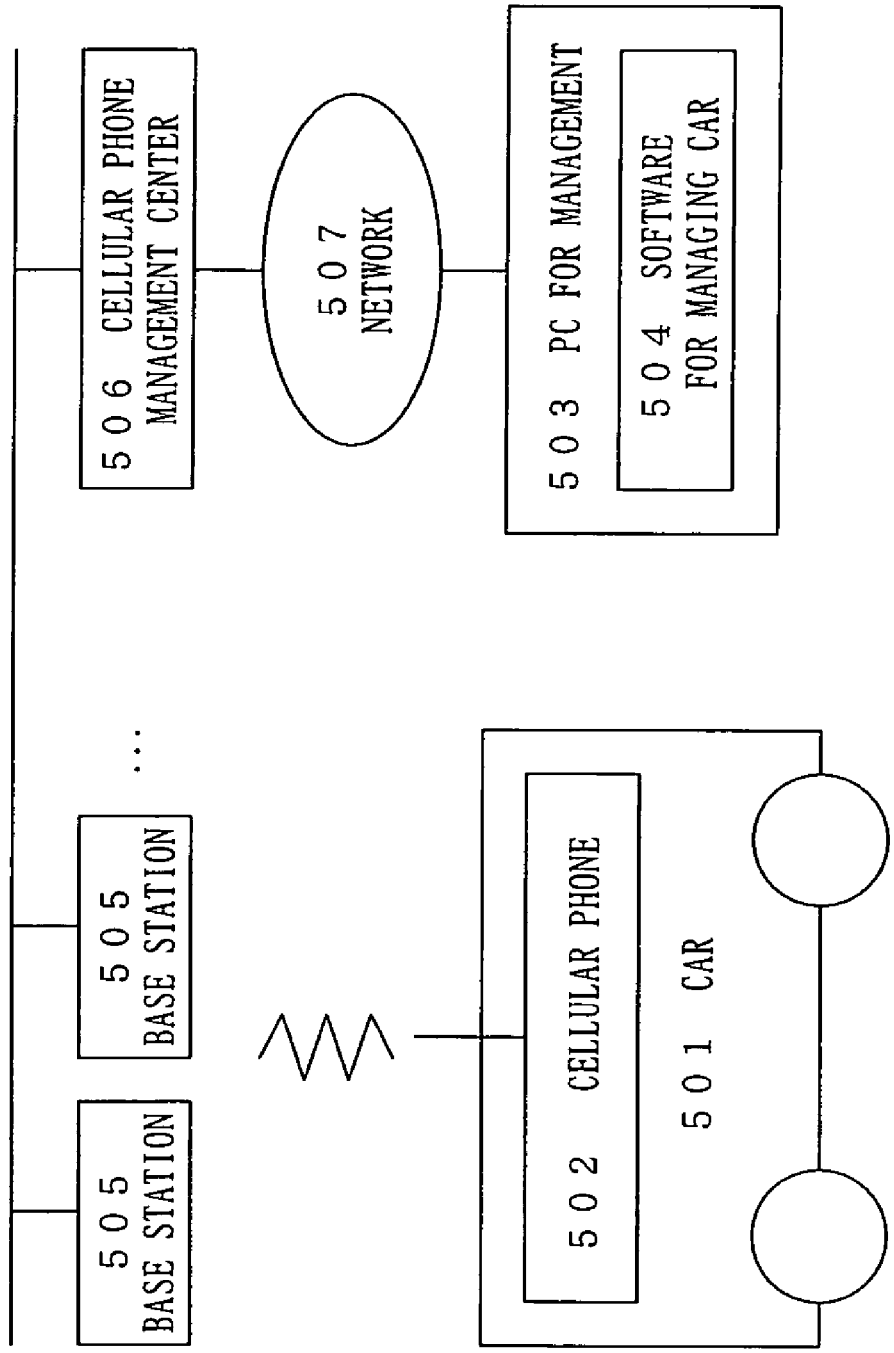
FIG. 17 illustrates a system configuration in Embodiment 5.

FIG. 17 shows a system configuration in Embodiment 5.

In FIG. 17, a car 501, a cellular phone 502, a PC 503 for managing, which manages the car 501, a software 504 for managing cars, a base station 505 for receiving radio wave from the cellular phone 502, a cellular phone management center 506 for managing communication of the cellular phone, and a network 507 used for communication between the PC 503 for managing and the cellular phone management center 506 are illustrated.

In this example, explanations are made on a case in which a function for specifying a location of a cellular phone is applied to management of cars by a delivery company. In this example, explanations are made on a case in which the system is applied to the management of the cars by the delivery company, however it is possible to apply the system to any case for specifying a location, e.g., obtaining a location of a monitor camera,, specifying a location of a stolen car, specifying a position of an elder person who wanders around due to senility, etc.

At first, the software 504 for managing cars operated in the PC 508 for managing inquires a location of the cellular phone 502 equipped in the car 501 to the cellular phone management center 506 for obtaining the location of the intended car 501.

Then, the cellular phone management center 506 connects to the cellular phone 502 to investigate the location of the cellular phone 502. The present location of the cellular phone 502 is specified based on the base station 505 which has received radio wave from the cellular phone 502.

Then, the cellular phone management center 506 returns the present location of the cellular phone 502 to the software 504 for managing cars as a response. The software 504 for managing cars generates an appropriate delivery plan, etc. based on the obtained location data.

As stated, the present location of the car can be extracted only by using the cellular phone without using the GPS.

Embodiment 6

In Embodiment 6, explanations are made on a system in which an event at the vending machine is reported in real time by using the cellular phone.

Figure 18:
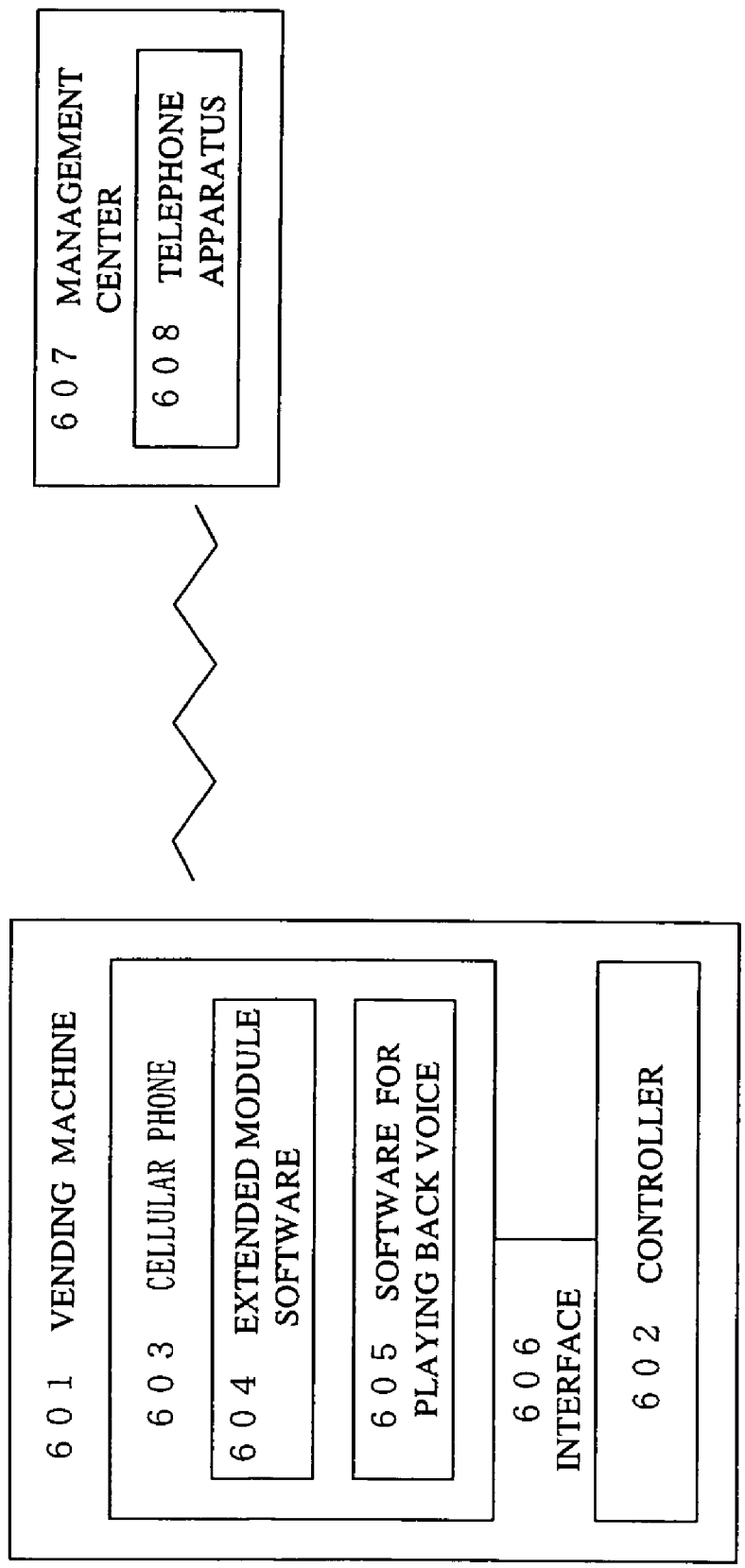
FIG. 18 illustrates a system configuration in Embodiment 6.

FIG. 18 shows a system configuration in Embodiment 6.

In FIG. 18, a vending machine 601, a controller 602 for controlling the vending machine 601, a cellular phone 603, an extended module software 604 for obtaining a condition of the controller 602, and reporting the event at the vending machine 601 by using a telephone function of the cellular phone 603 at a time of error or regularly, a software 605 for playing back voice, which is used when the extended module software 604 reports the event at the vending machine 601 by using the phone, an interface 606 for the controller for communicating between the controller 602 and the cellular phone 603, a management center 607 for managing a condition of the vending machine 601, and a telephone apparatus 608 for receiving a report of the event from the cellular phone 603 incorporated into the vending machine 601 are illustrated.

Explanations are made on a method for reporting the event in real time from the vending machine 601 to the management center 608 by using the telephone function of the cellular phone 603. In this example, explanations are made on a method for reporting the event from the vending machine 601 in real time, however the method can be applied to any device, e.g., car, monitor camera, electric power meter, etc.

The extended module software 604 checks if there is an event from the controller through the interface 605. For checking, a command for checking is regularly given to the controller 602, and an event is extracted from the controller 602. If this processing is not operated normally, it can be judged as a failure. In this case, the extended module software 604 gives the command for checking. However, it is also possible that a program for checking an event (not illustrated), which operates in the controller 602, reports to the extended module software 604 that there is an event.

In case that either an event or failure (the failure is included in the event, hereinafter) of the vending machine 601 are detected, the extended module software 604 generates voice data corresponding to the event at the vending machine 601, and calls the telephone apparatus 608 in the management center 607 by using the telephone function of the cellular phone 603. Voice data corresponding to the event can be generated here, or such data can be maintained in advance.

When a telephone connection can be established, the extended module software 604 reports contents of the event by phone using the software 605 for playing back the voice. If a telephone connection can not be established, the event is reported in the method explained in Embodiment 4. Hence, the event is reported certainly.

As stated, the event at the vending machine can be reported to the management center immediately.

In this invention, the server function is provided to the cellular phone. Therefore, both the space and cost of the whole communication system can be saved. Further, the cellular phone can provide contents to the terminal.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A communication system comprising:
   a cellular phone connected to a device controller; and
   a terminal connected to the cellular phone through a network,
   wherein the terminal includes a browser for outputting a request to the device controller, and a communication controller in a client side for sending the request to the cellular phone through the network, and
   wherein the cellular phone includes a communication controller in a server side for receiving the request, and a server for operating the device controller according to the request.

2. The communication system of claim 1, wherein the request is to obtain data from the device controller, wherein the server obtains the data from the device controller, wherein the communication controller in the server side sends the obtained data to the terminal through the network, wherein the communication controller in the client side receives the data, and wherein the browser displays based on the received data.

3. The communication system of claim 2, wherein the device controller is an apparatus for controlling a device connected to the device controller, and wherein the data are data concerning a condition of the device.

4. The communication system of claim 1, wherein the device controller is an apparatus for controlling a device connected to the device controller, wherein the request is to control the device.

5. The communication system of claim 1, wherein the browser is a Web browser, and wherein the server includes a Web server.

6. A communication method of a communication system having a cellular phone being connected to a device controller and a terminal connected to the cellular phone through a network, the method comprising:
   sending a request for the device controller from the terminal to the cellular phone through the network;
   receiving the request by the cellular phone; and
   operating the controller by the cellular phone according to the request.

7. A cellular phone, connected to a device controller and further connected to a terminal through a network, comprising:
   a communication controller in a server side for receiving a request for the device controller from the terminal through the network; and
   a server for operating the device controller according to the request.

8. A communication system comprising:
   a cellular phone being operatively connected to a device controller; and
   a terminal connected to the cellular phone through a network, wherein the terminal includes a browser for outputting a request to the device controller, and a communication controller in a client side for sending the request to the cellular phone through the network, and wherein the cellular phone includes a communication controller in a server side for receiving the request, and a server for operating the device controller according to the request.

9. The communication system of claim 8, wherein the request is to obtain data from the device controller, wherein the server obtains the data from the device controller, wherein the communication controller in the server side sends the obtained data to the terminal through the network, wherein the communication controller in the client side receives the data, and wherein the browser displays based on the received data.

10. The communication system of claim 9, wherein the server further comprises a device controlled by the device controller, and wherein the data are data concerning a condition of the device.

11. The communication system of claim 8, wherein the server further includes a device controlled by the device controller, and wherein the request is to control the device.

12. The communication system of claim 8, wherein the browser is a Web browser, and wherein the server includes a Web server.

13. A communication method of a communication system having a cellular phone including a device controller and a terminal connected to the cellular phone through a network, the method comprising:

sending a request for the device controller from the terminal to the cellular phone through the network;

receiving the request by the cellular phone; and operating the device controller by the cellular phone according to the request.

14. A cellular phone being operatively connected to a device controller being and connected to a terminal through a network, comprising:

a communication controller in a server side for receiving a request for the device controller from the terminal through the network; and a server for operating the device controller according to the request.

15. A cellular phone connected to a server through a network, comprising:

a browser for the cellular phone for outputting a first request;

a communication controller for transmitting the first request; and a server for the cellular phone operating according to the transmitted first request, wherein the browser for the cellular phone further outputs a second request, and wherein the communication controller further sends the second request to the server through the network, wherein the cellular phone is connected with a device controller for controlling a device, and wherein the first request is to control the device.

16. The cellular phone of claim 15, wherein the first request is to obtain data concerning the device.

17. A communication method of a cellular phone connected to a server through a network having a browser for the cellular phone, a server for the cellular phone and a communication controller, the method comprising:

outputting a first request by the browser for the cellular phone;

transmitting the first request by the communication controller;

operating according to the transmitted first request by the server for the cellular phone;

outputting a second request by the browser for the cellular phone; and sending the second request to the server through the network by the communication controller, wherein the cellular phone is connected with a device controller for controlling a device, and wherein the first request is to control the device.

18. A communication system comprising:

a terminal; and a cellular phone generating an electronic mail, the cellular phone being incorporated into or connected to a device for using the cellular phone as a mechanism for communicating between the device and the terminal, which manages the device, wherein the cellular phone generates and transmits the electronic mail to contain a description of a predetermined event to the terminal when the predetermined event occurs in the device.

19. A communication system comprising:

a terminal; and a cellular phone being incorporated into or connected to a device for using the cellular phone as a mechanism for communicating bi-directionally between the device and the terminal, which manages and operates the device, wherein the terminal acquires a location of the device by obtaining location data from the cellular phone.

20. A communication system comprising:

a terminal; and a cellular phone being incorporated into or connected to a device for using the cellular phone as a mechanism for communicating b-directionally between the device and the terminal, which controls the device, wherein contents of an event are informed by a telephone function of the cellular phone system in case that the event occurs in the device.

21. The communication system according to claim 1, wherein the controller controls a vending machine.

22. A vending machine comprising:

a control unit for controlling the vending machine via control data and for providing status data pertaining to the vending machine; and a cellular phone being connected to the control unit, the cellular phone communicating with a terminal via a network and providing the status data to the terminal and for providing the control unit with the control data that is provided by the terminal, wherein the cellular phone includes a communication controller that communicates with the terminal via a first data protocol, the first data protocol being utilized by a user in the terminal, and wherein the cellular phone communicates with the control unit via a second data protocol.

* * * * *